US009842055B2

(12) United States Patent
Eddy et al.

(10) Patent No.: US 9,842,055 B2
(45) Date of Patent: Dec. 12, 2017

(54) ADDRESS TRANSLATION CACHE THAT SUPPORTS SIMULTANEOUS INVALIDATION OF COMMON CONTEXT ENTRIES

(71) Applicant: VIA Alliance Semiconductor Co., Ltd., Shanghai (CN)

(72) Inventors: Colin Eddy, Austin, TX (US); Viswanath Mohan, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 14/890,334

(22) PCT Filed: Nov. 26, 2014

(86) PCT No.: PCT/IB2014/003116
§ 371 (c)(1),
(2) Date: Nov. 10, 2015

(87) PCT Pub. No.: WO2016/012832
PCT Pub. Date: Jan. 28, 2016

(65) Prior Publication Data
US 2016/0179701 A1 Jun. 23, 2016

Related U.S. Application Data

(60) Provisional application No. 62/026,830, filed on Jul. 21, 2014.

(51) Int. Cl.
*G06F 12/10* (2016.01)
*G06F 12/0891* (2016.01)
(Continued)

(52) U.S. Cl.
CPC ........ *G06F 12/0891* (2013.01); *G06F 12/109* (2013.01); *G06F 12/1027* (2013.01);
(Continued)

(58) Field of Classification Search
None
See application file for complete search history.

(56) References Cited

U.S. PATENT DOCUMENTS

| 5,430,850 | A | 7/1995 | Papadopoulos et al. |
| 5,715,427 | A | 2/1998 | Barrera et al. |

(Continued)

FOREIGN PATENT DOCUMENTS

| CN | 1512352 A | 7/2004 |
| CN | 101727405 A | 6/2010 |
| TW | I354205 | 12/2011 |

OTHER PUBLICATIONS

PCT/IB2014/003116. International Search Report (ISR) and Written Opinion (WO). Provided by State Intellectual Property Office of the P.R. China. May 27, 2015. pp. 1-9.

(Continued)

*Primary Examiner* — Mano Padmanabhan
*Assistant Examiner* — Jean Edouard
(74) *Attorney, Agent, or Firm* — E. Alan Davis; James W. Huffman

(57) ABSTRACT

A processor includes a mapping module that maps architectural virtual processor identifiers to non-architectural global identifiers and maps architectural process context identifiers to non-architectural local identifiers. The processor also includes a translation-lookaside buffer (TLB) having a plurality of address translations. For each address translation of the plurality of address translations: when the address translation is a global address translation, the address translation is tagged with a representation of one of the non-architectural global identifiers to which the mapping module has mapped one of the virtual processor identifiers; and when the address translation is a local address translation, the address translation is tagged with a representation of one of (Continued)

the non-architectural local identifiers to which the mapping module has mapped one of the process context identifiers.

20 Claims, 14 Drawing Sheets

(51) Int. Cl.
    *G06F 12/1036*     (2016.01)
    *G06F 12/1045*     (2016.01)
    *G06F 15/78*       (2006.01)
    *G06F 12/1027*     (2016.01)
    *G06F 12/109*      (2016.01)

(52) U.S. Cl.
    CPC ...... *G06F 12/1036* (2013.01); *G06F 12/1063* (2013.01); *G06F 15/7839* (2013.01)

(56) References Cited

U.S. PATENT DOCUMENTS

| | | | |
|---|---|---|---|
| 5,845,331 A | 12/1998 | Carter et al. | |
| 5,926,642 A * | 7/1999 | Favor | G06F 7/74 709/203 |
| 5,953,520 A | 9/1999 | Mallick | |
| 6,041,396 A | 3/2000 | Widigen | |
| 6,047,363 A | 4/2000 | Lewchuk | |
| 6,490,671 B1 | 12/2002 | Frank et al. | |
| 6,604,187 B1 | 8/2003 | McGrath et al. | |
| 7,194,597 B2 | 3/2007 | Willis et al. | |
| 7,234,038 B1 | 6/2007 | Durrant | |
| 7,363,462 B2 | 4/2008 | Landin et al. | |
| 8,074,055 B1 * | 12/2011 | Yates, Jr. | G06F 9/3005 712/209 |
| 8,522,253 B1 | 8/2013 | Rozas et al. | |
| 2002/0087825 A1 * | 7/2002 | Nagapudi | G06F 12/0802 711/207 |
| 2003/0065890 A1 * | 4/2003 | Lyon | G06F 12/0891 711/141 |
| 2004/0221127 A1 * | 11/2004 | Ang | G06F 12/1027 711/203 |
| 2005/0022192 A1 | 1/2005 | Kim | |
| 2005/0086451 A1 * | 4/2005 | Yates, Jr. | G06F 9/45533 712/32 |
| 2006/0064567 A1 * | 3/2006 | Jacobson | G06F 12/1036 711/207 |
| 2006/0126619 A1 | 6/2006 | Teisberg et al. | |
| 2008/0005528 A1 | 1/2008 | Morris | |
| 2008/0005529 A1 | 1/2008 | Morris | |
| 2008/0046679 A1 * | 2/2008 | Bennett | G06F 12/1009 711/207 |
| 2009/0070546 A1 | 3/2009 | Choudhury et al. | |
| 2009/0327646 A1 * | 12/2009 | Jordan | G06F 12/1036 711/207 |
| 2010/0250869 A1 * | 9/2010 | Adams | G06F 12/1063 711/154 |
| 2010/0332786 A1 * | 12/2010 | Grohoski | G06F 9/3851 711/207 |
| 2010/0332787 A1 * | 12/2010 | Grohoski | G06F 12/1027 711/207 |
| 2011/0145511 A1 | 6/2011 | Woffinden | |
| 2011/0320749 A1 | 12/2011 | Gonion | |
| 2013/0111183 A1 * | 5/2013 | Shirahige | G06F 12/1036 711/206 |
| 2013/0297917 A1 | 11/2013 | Nguyen et al. | |
| 2014/0068612 A1 | 3/2014 | Torrey | |
| 2014/0365753 A1 | 12/2014 | Hooker et al. | |
| 2014/0380009 A1 | 12/2014 | Lemay et al. | |
| 2015/0220436 A1 * | 8/2015 | Cooray | G06F 12/10 711/122 |
| 2016/0041922 A1 | 2/2016 | Parks et al. | |
| 2016/0224399 A1 | 8/2016 | Zheng et al. | |

OTHER PUBLICATIONS

PCT/IB2014/003110. International Search Report (ISR) and Written Opinion (WO). Provided by State Intellectual Property Office of the P.R. China. May 27, 2015. pp. 1-7.

PCT/IB2014/003084. International Search Report (ISR) and Written Opinion (WO). Provided by State Intellectual Property Office of the P.R. China May 27, 2015. pp. 1-8.

Werner, Julius. "Improving Virtualization Support in the Fiasco OC Microkernel." *Masters Thesis*. Technische Universität Berlin, Berlin, Germany. pp. 1-54 Apr.-Aug. 2012.

* cited by examiner

FIG. 9

|   | V 906 | GID 904 | LID 902 | PCID 908 | ACTB 912 |
|---|---|---|---|---|---|
| 0 | V 906 | GID 904 | LID 902 | PCID 908 | ACTB 912 |
| 1 | V 906 | GID 904 | LID 902 | PCID 908 | ACTB 912 |
| 2 | V 906 | GID 904 | LID 902 | PCID 908 | ACTB 912 |
| 3 | V 906 | GID 904 | LID 902 | PCID 908 | ACTB 912 |

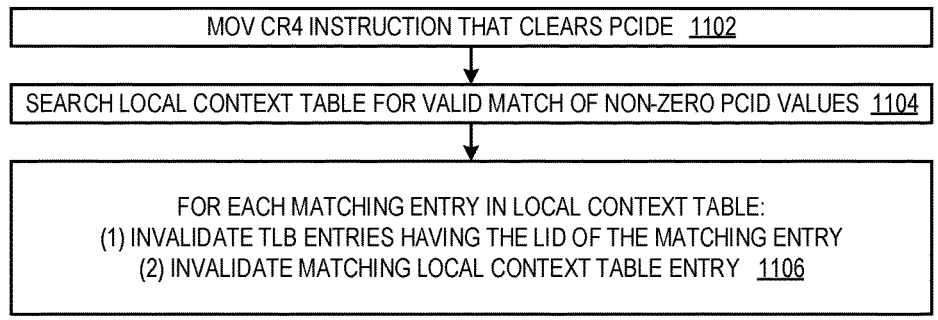

214

|   | V 1006 | GID 1004 | VPID 1008 | EPTP 1012 |
|---|---|---|---|---|
| 0 | V 1006 | GID 1004 | VPID 1008 | EPTP 1012 |
| 1 | V 1006 | GID 1004 | VPID 1008 | EPTP 1012 |
| 2 | V 1006 | GID 1004 | VPID 1008 | EPTP 1012 |
| 3 | V 1006 | GID 1004 | VPID 1008 | EPTP 1012 |

FIG. 11

MOV CR4 INSTRUCTION THAT CLEARS PCIDE 1102
↓
SEARCH LOCAL CONTEXT TABLE FOR VALID MATCH OF NON-ZERO PCID VALUES 1104
↓
FOR EACH MATCHING ENTRY IN LOCAL CONTEXT TABLE:
(1) INVALIDATE TLB ENTRIES HAVING THE LID OF THE MATCHING ENTRY
(2) INVALIDATE MATCHING LOCAL CONTEXT TABLE ENTRY 1106

FIG. 12

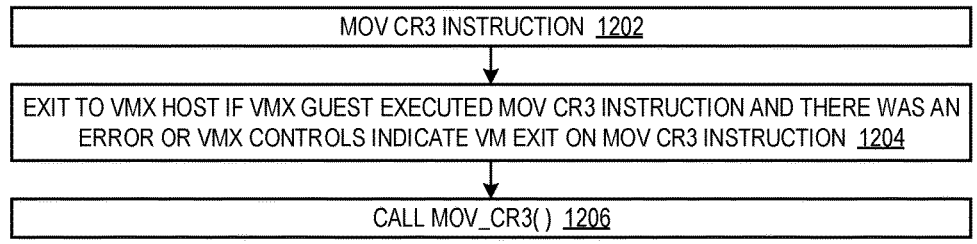

MOV CR3 INSTRUCTION 1202
↓
EXIT TO VMX HOST IF VMX GUEST EXECUTED MOV CR3 INSTRUCTION AND THERE WAS AN ERROR OR VMX CONTROLS INDICATE VM EXIT ON MOV CR3 INSTRUCTION 1204
↓
CALL MOV_CR3( ) 1206

US 9,842,055 B2

ADDRESS TRANSLATION CACHE THAT SUPPORTS SIMULTANEOUS INVALIDATION OF COMMON CONTEXT ENTRIES

CROSS REFERENCE TO RELATED APPLICATION(S)

This application claims priority based on U.S. Provisional Application Ser. No. 62/026,830, filed Jul. 21, 2014, which is hereby incorporated by reference in its entirety.

This application is related to the following U.S. Non-Provisional Applications filed concurrently herewith, each of which is a national stage application under 35 U.S.C. 371 of the correspondingly indicated International Application filed Nov. 26, 2014, each of which is hereby incorporated by reference in its entirety.

U.S. Non-Provisional Serial No. International Application No.

Ser. No. 14/761,126 PCT/IB2014/003084
Ser. No. 14/890,334 PCT/IB2014/003116
Ser. No. 14/890,341 PCT/IB2014/003110

BACKGROUND

Modern processors support virtual memory capability. A virtual memory system maps, or translates, virtual addresses used by a program to physical addresses used by hardware to address memory. Virtual memory has the advantages of hiding the fragmentation of physical memory from the program, facilitating program relocation, and of allowing the program to see a larger memory address space than the actual physical memory available to it. These advantages are particularly beneficial in modern systems that support time-sharing of the processor by multiple programs or processes.

The operating system creates and maintains in memory translation tables, often referred to as page tables in a paged virtual memory system, that map virtual addresses to physical addresses. The translation tables may be in the form of a hierarchy of tables, some of which map virtual addresses to intermediate table addresses. When a program accesses memory using a virtual address, the translation tables must be accessed to accomplish the translation of the virtual address to its physical address, commonly referred to as a page table walk, or table walk. The additional memory accesses to access the translation tables can significantly delay the ultimate access to the memory to obtain the data or instruction desired by the program.

Modern processors include translation-lookaside buffers (TLB) to address this problem and improve performance. A TLB is a hardware structure of a processor that caches the virtual to physical address translations in order to greatly reduce the likelihood that the translation tables will need to be accessed. The virtual address to be translated is looked up in the TLB and the TLB provides the physical address, if the virtual address hits in the TLB, in much less time than would be required to access the translation tables in memory to perform the table walk. The efficiency (hit rate) of TLBs is crucial to processor performance.

Each process, or context, has its own unique address space and associated address translations. Therefore, the TLB entries for one process might be incorrect for another process. That is, the TLB entries created for one process might be stale with respect to another process. One phenomenon that can reduce TLB efficiency is when the processor switches from running one process to running a different process. The system must ensure that it does not use stale TLB entries to incorrectly translate virtual addresses of the new process by using address translations cached in the TLB for the old process.

BRIEF SUMMARY

In one aspect the present invention provides a translation-lookaside buffer (TLB). The TLB includes a plurality of entries, wherein each entry of the plurality of entries is configured to hold an address translation and a valid bit vector, wherein each bit of the valid bit vector indicates, for a respective address translation context, the address translation is valid if set and invalid if clear. The TLB also includes an invalidation bit vector having bits corresponding to the bits of the valid bit vector of the plurality of entries, wherein a set bit of the invalidation bit vector indicates to simultaneously clear the corresponding bit of the valid bit vector of each entry of the plurality of entries.

In another aspect, the present invention provides a method for operating a translation-lookaside buffer (TLB) comprising a plurality of entries, wherein each entry of the plurality of entries is configured to hold an address translation and a valid bit vector, wherein each bit of the valid bit vector indicates, for a respective address translation context, the address translation is valid if set and invalid if clear. The method includes receiving an invalidation bit vector having bits corresponding to the bits of the valid bit vector of the plurality of entries and simultaneously clearing the bit of the valid bit vector of each entry of the plurality of entries corresponding to a set bit of the invalidation bit vector.

In yet another aspect, the present invention provides a processor. The processor includes translation-lookaside buffer (TLB) and a mapping module. The TLB includes a plurality of entries, wherein each entry of the plurality of entries is configured to hold an address translation and a valid bit vector, wherein each bit of the valid bit vector indicates, for a respective address translation context, the address translation is valid if set and invalid if clear. The TLB also includes an invalidation bit vector having bits corresponding to the bits of the valid bit vector of the plurality of entries, wherein a set bit of the invalidation bit vector indicates to simultaneously clear the corresponding bit of the valid bit vector of each entry of the plurality of entries. The mapping module generates the invalidation bit vector.

BRIEF DESCRIPTION OF THE DRAWINGS

FIG. 9 is a block diagram illustrating in more detail the local context table of FIG. 2.

FIG. 10 is a block diagram illustrating in more detail the global context table of FIG. 2.

FIG. 11 is a flowchart illustrating operation of the processor of FIG. 1 to perform an instruction that disables the architectural feature of the processor that supports multiple process context identifiers.

FIG. 12 is a flowchart illustrating operation of the processor of FIG. 1 to perform an instruction that changes the current address translation context.

DETAILED DESCRIPTION OF THE EMBODIMENTS

Glossary

Figure 1:
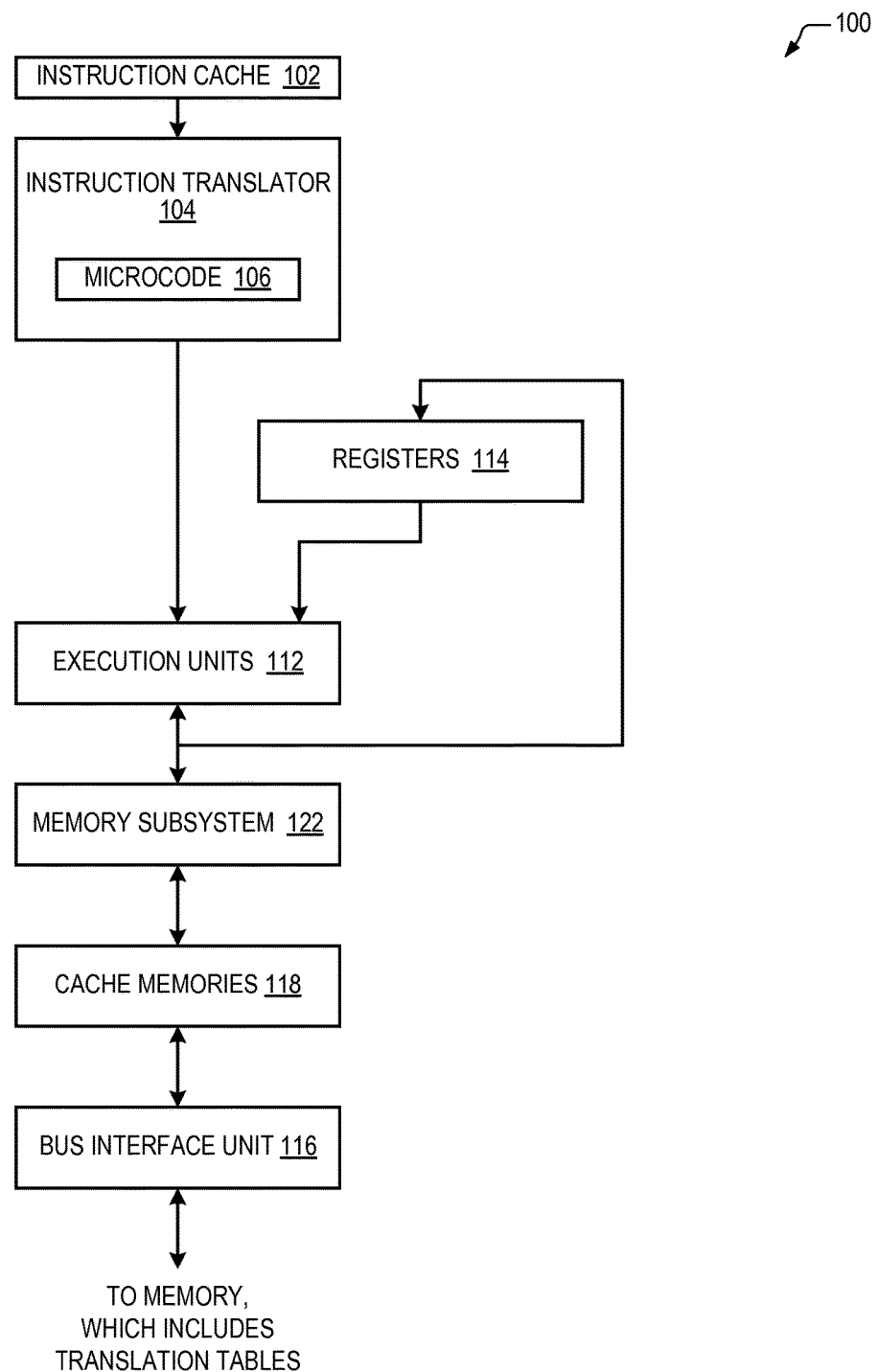
FIG. 1 is a block diagram illustrating a processor.

An address translation context is a set of information that enables the translation of memory addresses from a first memory address space to a second memory address space. An example of an address translation context in the x86 ISA may be the set of information included in the CR3 register (and other control registers, e.g., CR0 and CR4 and related model specific registers (MSR)), page tables, page directories, page-directory-pointer tables, PML4 tables, extended page table pointers (EPTP), and/or extended page tables (EPTs) that enable translation of linear addresses to physical memory addresses. In the case of the x86 ISA, the translation is performed by hardware within the processor. However, in other ISAs (e.g., MIPS, SPARC), the operating system may perform the translation. Another example of an address translation context in the ARM ISA may be the set of information included in the translation table base register (TTBR) (and other control registers, e.g., translation control register (TCR), system control register (SCTLR) and Hyp configuration register (HCR)) and/or translation tables.

An address translation is a pair of memory addresses in which a first of the pair is the address to be translated and the second of the pair is the translated address.

A local address translation is an address translation in which a single address translation context is used to translate the address to be translated into the translated address.

A global address translation is an address translation in which multiple address translation contexts are used to translate the address to be translated into the translated address.

A local memory page, or local page, is a memory page that has a local address translation.

A global memory page, or global page, is a memory page that has a global address translation.

Various well-known instruction set architectures (ISA) include features designed to improve TLB efficiency. For example, the x86 ISA includes support for PCIDs, VPIDs and EPTPs. It also includes instructions that instruct the processor to invalidate TLB entries associated with a given PCID, VPID and/or EPTP. A processor implementation that invalidates the associated TLB entries one at a time may require a relative long time to execute the instructions, particularly if the TLB is relatively large and many entries need to be invalidated. Advantageously, embodiments are described herein that support simultaneous invalidation of entries of a TLB that require invalidation.

Furthermore, to avoid including a large number of bits in each TLB entry to store the information needed to the entire address translation context space supported by a processor's ISA, embodiments are described in which the large space is mapped to a much smaller non-architectural space, which advantageously enables the TLB entries to include far fewer bits. However, this requires invalidation of TLB entries associated with an address translation context that must be unmapped from the small non-architectural space when a new address translation context needs to be mapped into the smaller non-architectural space. Embodiments are described herein that advantageously enable the processor to simultaneously invalidate all TLB entries associated with the address translation context being unmapped. Advantageously, embodiments take into account the nature of local and global address translations and support efficiencies for invalidating TLB entries of the two types.

Referring now to FIG. 1, a block diagram illustrating a processor 100 is shown. The processor 100 includes an instruction cache 102, an instruction translator 104 that includes microcode 106, execution units 112, architectural registers 114, a memory subsystem 122, a cache memory hierarchy 118 and a bus interface unit 116. Other functional units (not shown) may include a table walk engine, which performs translation table walks to generate virtual to physical address translations; branch predictors; a reorder unit; a reorder buffer; reservations stations; an instruction scheduler; and data prefetch units, among others. In one embodiment, the microprocessor 100 has an out-of-order execution microarchitecture in that instructions may be issued for execution out of program order. In one embodiment, the microprocessor 100 has a superscalar microarchitecture in that it is capable of issuing multiple instructions per clock cycle to the execution units 112 for execution. In one embodiment, the microprocessor 100 conforms substantially to the x86 instruction set architecture (ISA), however, other ISAs are contemplated.

Figure 2:
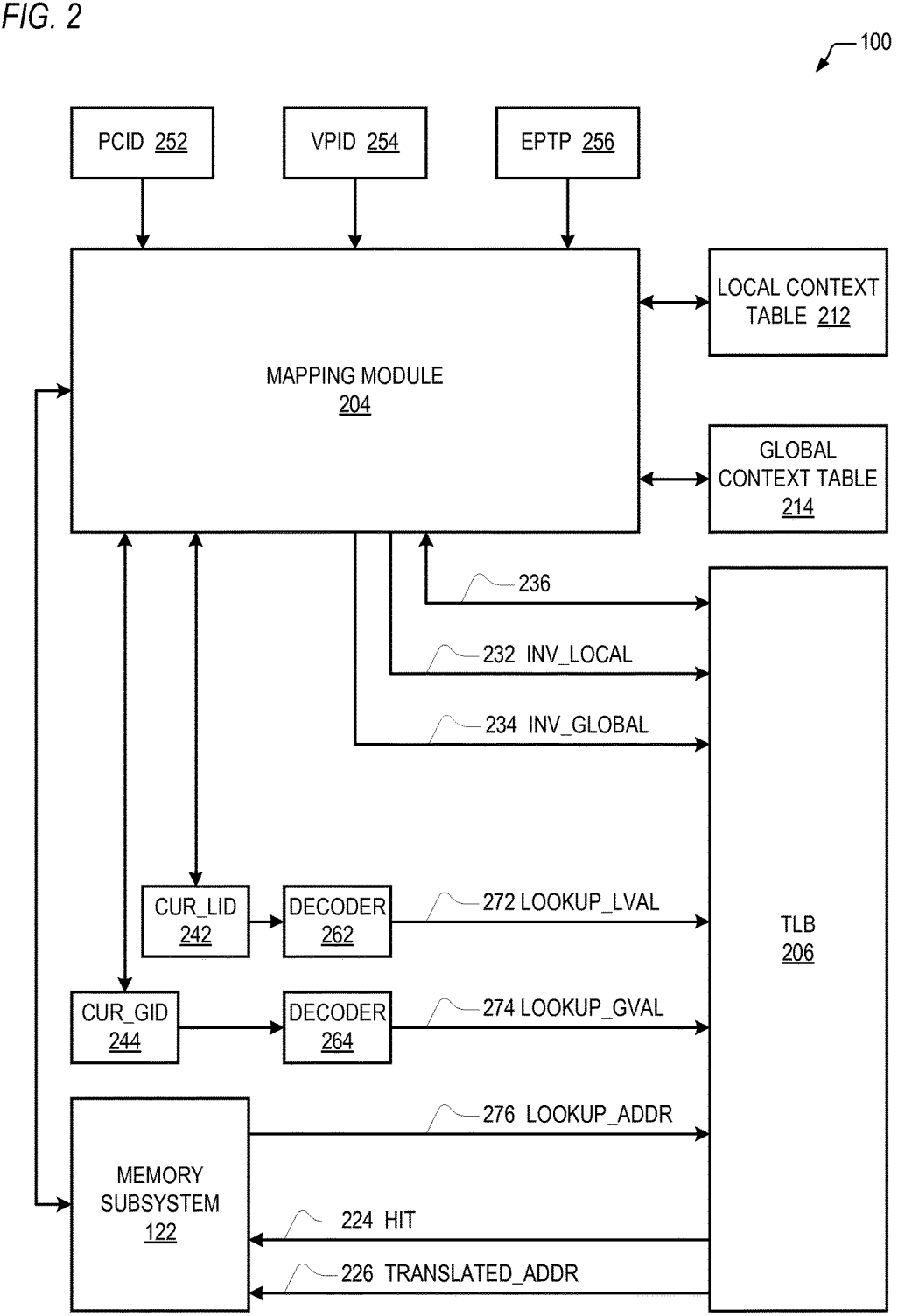
FIG. 2 is a block diagram illustrating portions of the processor of FIG. 1 in more detail.

The instruction cache 102 caches architectural instructions fetched from system memory with which the bus interface unit 116 communicates. Preferably, a TLB, such as TLB 206 of FIG. 2, is associated with the instruction cache 102 that caches address translations for instructions. In one embodiment, the instruction translator 104 translates the architectural instructions fetched from the instruction cache 102 into microinstructions of a microinstruction set of the microarchitecture of the microprocessor 100. The execution units 112 execute the microinstructions. The microinstructions into which an architectural instruction is translated implement the architectural instruction.

The execution unit 112 receives source operands from the architectural registers 114 (or perhaps from the reorder buffer or a forwarding bus). Operands are loaded into the registers 114 from memory via the memory subsystem 122. The memory subsystem 122 writes data to and reads data from the cache memory hierarchy 118 (e.g., level-1 data cache, level-2 cache, level-3 cache). Preferably, each cache memory has an associated TLB, such as TLB 206 of FIG. 2. If a cache miss occurs to the last level cache of the cache hierarchy 118, the data or instruction cache line is requested from the bus interface unit 116, which fetches the cache line from system memory.

The memory subsystem 122 (e.g., table walk engine) also accesses translation tables (referred to as paging structures in the x86 ISA, for example) in system memory to perform page table walks to generate virtual to physical address translations, which are subsequently loaded into the TLBs of the processor 100, such as TLB 206 of FIG. 2, as described below in more detail with respect to FIG. 4. The translation tables may include tables that map a page (e.g., x86 ISA page tables) or that reference other translation tables (e.g., x86 ISA page directories, page-directory-pointer tables, PML4 tables) in a translation table hierarchy. The translation tables may also include tables that map virtualized physical addresses (the virtualized physical addresses are referred to as guest physical addresses and the translation tables are referred to as extended page tables (EPT) in the x86 ISA, for example) to true physical addresses (referred to as host physical addresses in the x86 ISA, for example).

Preferably, the processor 100 includes a microcode unit that includes a microcode memory configured to store the microcode 106, or microcode routines, and a microsequencer for fetching from the microcode memory instructions of the microcode. In one embodiment, the microcode instructions are microinstructions; in one embodiment the microcode instructions are translated into microinstructions. The microcode 106 implements some of the architectural instructions, such as particularly complex architectural instructions. In one embodiment, the MOV CR4, MOV_CR3, VMLAUNCH/VMRESUME, RSM, INVPCID, INVVPID and INVEPT instructions of FIGS. 11, 12, 15, 21, 22, 23 and 24, respectively, are implemented in microcode 106. Additionally, the microcode 106 performs other functions of the processor 100. In one embodiment, the microcode 106 handles VM exits and SMIs of FIGS. 19 and 20, respectively, which are described in more detail below.

Referring now to FIG. 2, a block diagram illustrating portions of the processor 100 of FIG. 1 in more detail is shown. The processor 100 includes a translation-lookaside buffer (TLB) 206, a mapping module 204 coupled to the TLB 206, a memory subsystem 122 coupled to the TLB 206 and mapping module 204, a local context table 212 and a global context table 214 coupled to the mapping module 204. The mapping module 204 comprises microcode, a hardware state machine, or a combination thereof. The mapping module 204 receives a process context identifier (PCID) 252, a virtual processor identifier (VPID), and an extended page table pointer (EPTP) 256. The mapping module 204 receives the PCID 252, VPID 254 and EPTP 256 in response to various events, such as instructions that change the current address translation context and/or invalidate an address translation context, some of which are described below. In response to receiving the PCID 252, VPID 254 and EPTP 256, the mapping module 204 may advantageously simultaneously invalidate multiple local address translations and/or multiple global address translations in the TLB 206 by generating an invalidate local (INV_LOCAL) bit vector 232 and/or an invalidate global (INV_GLOBAL) bit vector 234, respectively. This operation is described further below with respect to FIGS. 6 through 8, for example, and its use is described below with respect to FIGS. 11, 13-14, 16, 18-20 and 22-24, for example.

Additionally, in response to receiving the PCID 252, VPID 254 and EPTP 256, the mapping module 204 may update a current local context identifier (CUR_LID) 242 and/or current global context identifier (CUR_GID) 244. The CUR_LID 242 and CUR_GID 244 identify the current address translation context. Specifically, the CUR_LID 242 identifies local memory pages of the current address translation context, and the CUR_GID 244 identifies global memory pages of the current address translation context, as described in more detail below. Preferably, the CUR_LID 242 is an encoded value, and a decoder 262 decodes the CUR_LID 242 and provides a lookup local valid (LOOKUP_LVAL) decoded one-hot bit vector 272 (i.e., one bit is set and the others are clear) to the TLB 206; and the CUR_GID 244 is an encoded value, and a decoder 264 decodes the CUR_GID 244 and provides a lookup global valid (LOOKUP_GVAL) decoded one-hot bit vector 274 to the TLB 206. Other embodiments are contemplated for representing the CUR_LID 242 and CUR_GID 244. For example, they may themselves be stored in a decoded form and provided directly to the TLB 206 without the need for the decoders 262/264.

When the memory subsystem 122 wants to perform a lookup of a virtual address of a memory page in the TLB 206, it provides the lookup address (LOOKUP_ADDR) 276 to the TLB 206. The LOOKUP_LVAL 272 and the LOOKUP_GVAL 274 are also provided to the TLB 206 and are included in the lookup. The TLB 206 indicates whether a hit occurred via a hit indicator 224 and, if so, provides a translated address (TRANSLATED_ADDR) 226 to the memory subsystem 122. This operation is described in more detail below with respect to FIG. 4.

Figure 3:
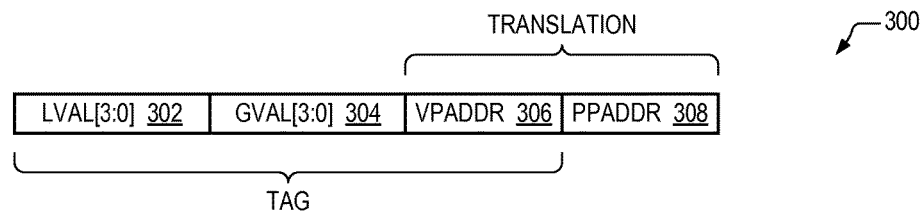
FIG. 3 is a block diagram illustrating an entry in the TLB.

Referring now to FIG. 3, a block diagram illustrating an entry 300 in the TLB 206 is shown. Each TLB 206 entry 300 includes a local valid bit vector (LVAL) 302, a global valid bit vector (GVAL) 304, a virtual page address (VPADDR 306) and a physical page address (PPADDR) 308. In one embodiment, the LVAL 302 comprises four bits and the GVAL 304 comprises four bits. The LVAL 302, GVAL 304 and VPADDR 306 are collectively referred to as the tag of the entry 300. The VPADDR 306 and the PPADDR 308 are collectively referred to as the address translation of the entry 300. Although not shown, preferably the TLB entry 300 also includes permissions bits that specify the permissions associated with the page.

In one embodiment, the mapping module 204 guarantees: (1) every LID is mapped from a unique VPID:EPTP:PCID combination (extended page table feature enabled), VPID:PCID combination (extended page table feature disabled), or PCID (virtual processor identifier feature disabled); (2) every GID is mapped from a unique VPID:EPTP combination (extended page table feature enabled) or VPID (extended page table feature disabled); (3) if a TLB 206 entry 300 is a valid global address translation (e.g., GVAL 304 is non-zero), it is not a valid local address translation (the LVAL 302 is zero); conversely, (4) if a TLB 206 entry 300 is a valid local address translation (e.g., LVAL 302 is non-zero), it is not a valid global address translation (the GVAL 304 is zero). Some advantages of the above guarantees are that the mapping module 204 can: (1) simultaneously invalidate all TLB 206 global address translations; and (2) simultaneously invalidate all TLB 206 local address translations. Furthermore, the mapping module 204 does not guarantee that LIDs are mapped from unique PCIDs. That is, the same PCID value can be specified by multiple virtual processors and therefore be mapped to different LIDs. Similarly, the mapping module 204 may associated multiple LIDs with a given GID. However, the converse is not true, i.e., the mapping module 204 does not associate multiple GIDs with a given LID. However, at some point in the operation of the processor 100, every LID could correspond to a unique GID, e.g., in an embodiment in which the number of GIDs and LIDs is equal (denoted N) and at the point in time there are N virtual processors each having specified a single PCID.

Figure 4:
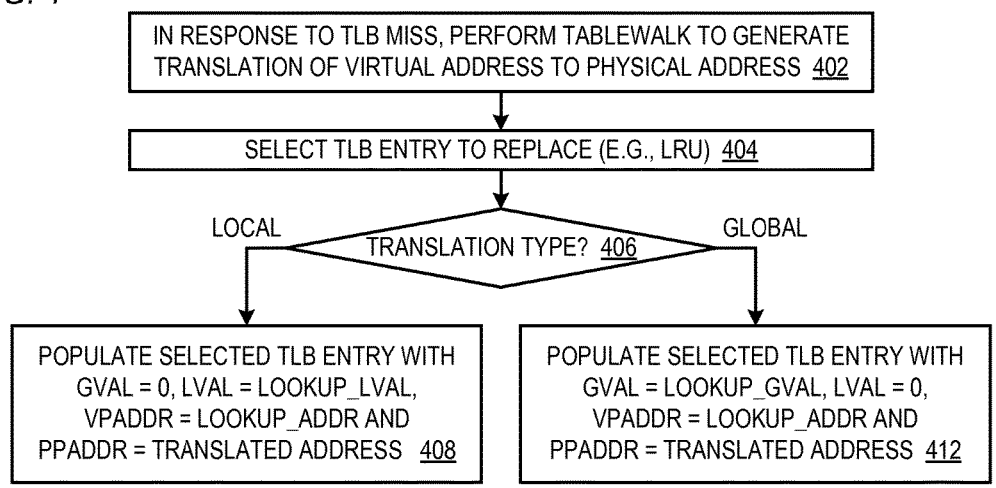
FIG. 4 is a flowchart illustrating operation of the processor of FIG. 1 to populate an entry of the TLB.

Referring now to FIG. 4, a flowchart illustrating operation of the processor 100 of FIG. 1 to populate an entry 300 of the TLB 206 is shown. Flow begins at block 402.

At block 402, the memory subsystem 122 detects a miss of a LOOKUP_ADDR 276 in the TLB 206 and performs a tablewalk to generate an address translation. That is, the memory subsystem 122 uses the current address translation context to translate the missing LOOKUP_ADDR 276 into a physical address. The memory subsystem 122 may include a tablewalk engine (not shown) that performs the tablewalk. The tablewalk may include a portion that uses legacy paging structures (e.g., x86 ISA page descriptor base address, page descriptor tables and page table entries) as well as extended page tables associated with virtual machine capabilities of the processor 100 (e.g., x86 ISA Virtual Machine eXtensions (VMX) extended page table pointers (EPTP) and extended page tables (EPTs)). Flow proceeds to block 404.

At block 404, the memory subsystem 122 selects an entry 300 in the TLB 206 to replace. In one embodiment, the TLB 206 is a set-associative cache, and each set of the TLB 206 include replacement information, such as least recently used (LRU) or pseudo-LRU information, and the memory subsystem 122 selects for replacement the entry 300 of the indexed set indicated by the replacement information. Flow proceeds to decision block 406.

At decision block 406, the memory subsystem 122 determines whether the address translation is a global translation or a local translation. Preferably, the memory subsystem 122 makes the determination based on information in the current address translation context when performing the tablewalk at block 402. If global, flow proceeds to block 412; otherwise, flow proceeds to block 408.

At block 408, the memory subsystem 122 populates the TLB 206 entry 300 selected at block 404 with a GVAL 304 of zero because the address translation is a local address translation, an LVAL 302 equal to the LOOKUP_LVAL 272 (which is a representation of the CUR_LID 242), a VPADDR 306 equal to the missing LOOKUP_ADDR 276, and a PPADDR 308 equal to the translated address, i.e., the physical address generated by the tablewalk at block 402. Flow ends at block 408.

At block 412, the memory subsystem 122 populates the TLB 206 entry 300 selected at block 404 with a GVAL 304 equal to the LOOKUP_GVAL 274 (which is a representation of the CUR_GID 244), an LVAL 302 of zero because the address translation is a global address translation, a VPADDR 306 equal to the missing LOOKUP_ADDR 276, and a PPADDR 308 equal to the translated address, i.e., the physical address generated by the tablewalk at block 402. Flow ends at block 412.

Figure 5:
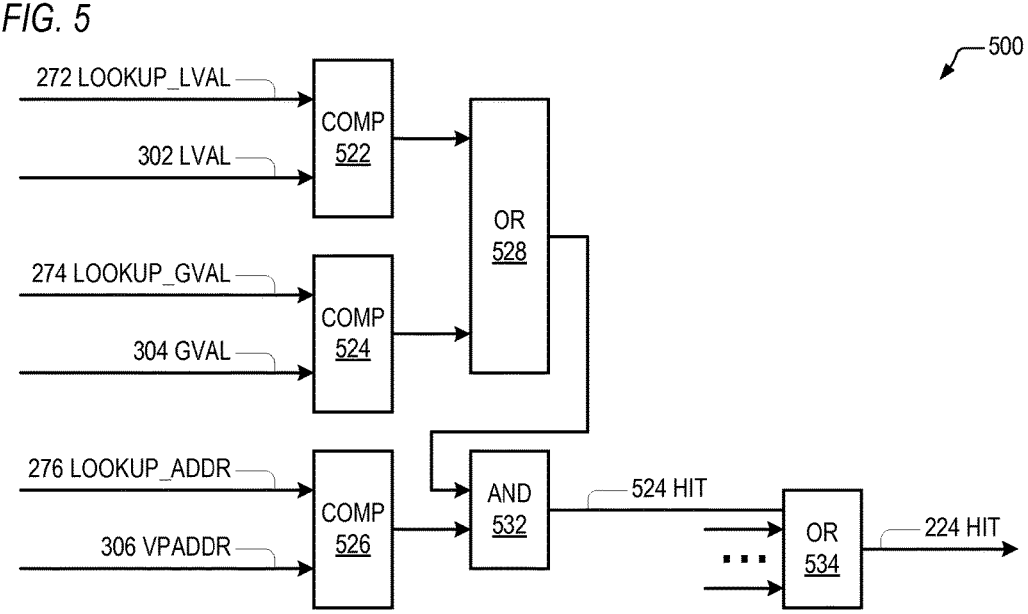
FIG. 5 is a block diagram illustrating logic within the TLB for determining whether a hit occurred on a lookup.

Referring now to FIG. 5, a block diagram illustrating logic 500 within the TLB 206 for determining whether a hit 224 occurred on a lookup is shown. The logic 500 shown (except for OR function 534) in FIG. 5 corresponds to a single entry 300 of the TLB 206 to determine whether a hit 524 was generated for the entry 300. However, it should be understood that for a fully associative embodiment, the logic 500 exists within the TLB 206 for every entry 300, but is not shown for simplicity and clarity, and for a set-associative embodiment, the logic 500 exists per way. The hit indicator 524 of all of the entries 300 of the TLB 206 are Boolean OR-ed by OR function 534 to generate the TLB 206 hit indicator 224 of FIG. 1. It should be understood that the various Boolean functions shown in FIG. 5 and the other Figures may correspond to Boolean gates (e.g., AND gates, OR gates), which may be synthesized or custom designed; however, the logic 500 may comprise other hardware elements known to perform the Boolean functions shown, e.g., wired-OR, and may be implemented in various logic types, including static or dynamic logic. Advantageously, the embodiments described enable simultaneous invalidation of local and/or global address translations of the TLB 206 regardless of the underlying process technology or logic types.

The logic 500 includes a first comparison function 522 of the LOOKUP_LVAL 272 and the LVAL 302 of the entry 300 whose output is provided as a first of two inputs to a Boolean OR function 528. The logic 500 also includes a second comparison function 524 of the LOOKUP_GVAL 274 and the GVAL 304 of the entry 300 whose output is provided as the second input to Boolean OR function 528. The output of Boolean OR function 528 is provided as a first of two inputs to a Boolean AND function 532. The logic 500 includes a third comparison function 522 of the LOOKUP_ADDR 276 and the VPADDR 306 of the entry 300 whose output is provided as the second input to Boolean AND function 532. The output of Boolean AND function 532 is hit indicator 524 that is true if the LOOKUP_LVAL 272 matches the LVAL 302 and the LOOKUP_GVAL 274 matches the GVAL 304 and the LOOKUP_ADDR 276 matches the VPADDR 306, and otherwise is false.

As may be observed from FIG. 5, each local address translation within the TLB 206 is identified by its respective LVAL 302, which is a representation of its local context identifier; and each global address translation is identified by its respective GVAL 304, which is a representation of its global context identifier. The LOOKUP_LVAL 272 and the LOOKUP_GVAL 274 are included in the TLB 206 lookup. However, along with a match of the LOOKUP_ADDR 276 and VPADDR 306, only either the LOOKUP_LVAL 272 need match the LVAL 302 or the LOOKUP_GVAL 274 need match the GVAL 304, but not both, i.e., not the entire tag, in order for a hit to occur. Thus, as may be observed from the operation described with respect to FIGS. 4 and 5, in order to use an address translation from the TLB 206, the address translation context used to translate the PPADDR 308 from the VPADDR 306 must be the address translation context associated with the CUR_LID 242 or one of multiple address translation contexts associated with the CUR_GID 244.

Figure 6:
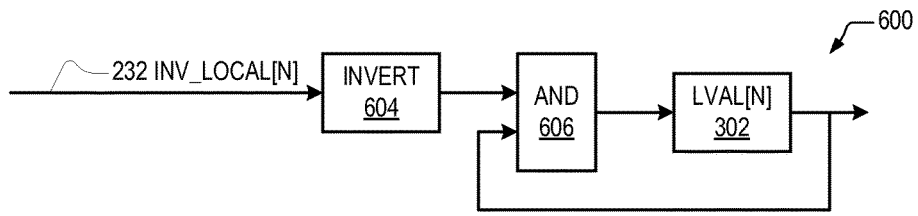
FIG. 6 is a block diagram illustrating logic used to invalidate a bit of the LVAL bit vector of an entry of FIG. 3 of the TLB of FIG. 2.

Referring now to FIG. 6, a block diagram illustrating logic 600 used to invalidate a bit of the LVAL bit vector 302 of an entry 300 of FIG. 3 of the TLB 206 of FIG. 2 is shown. FIG. 6 shows a single bit of the LVAL bit vector 302. The storage for the bit may be a flip-flop, a memory array bit cell, or other bit storage device. A Boolean invert (NOT) function 604 receives the bit of the INV_LOCAL bit vector 232 that corresponds to the bit of the LVAL bit vector 302. For example, bit [2] of the INV_LOCAL bit vector 232 is received by the invert function 604 for bit [2] of the LVAL bit vector 302. The output of the invert function 604 is provided to a first of two inputs to a Boolean AND function 606. The second input of the Boolean AND function 606 receives the current value of the LVAL bit vector 302. The output of the Boolean AND function 606 is clocked in as the new value of the LVAL bit vector 302. Thus, the mapping module 204 is able to clear any bit of the LVAL bit vector 302 by setting the corresponding bit of the INV_LOCAL bit vector 232.

Although FIG. 6 shows the logic 600 for a single bit, the logic 600 is replicated within the TLB 206 for each bit of the LVAL bit vector 302 for each entry 300 of the TLB 206. Advantageously, by setting a bit of the INV_LOCAL bit vector 232, the mapping module 204 clears the corresponding bit of the LVAL bit vector 302 for every entry 300 of the TLB 206. Since each bit position of the LVAL 302 is the valid bit for all the local address translations for a respective address translation context, the invalidation logic 600 enables the mapping module 204 to simultaneously invalidate all the local address translations in the TLB 206 for the respective address translation context. This is advantageous because it is faster than sequentially invalidating the local address translations in the TLB 206 for the respective address translation context. Indeed, as the size of the TLB 206 grows (e.g., for a large last-level TLB 206), the time saved may become more significant.

Additionally, the TLB 206 includes similar logic 600 for each bit of the GVAL bit vector 304 for each entry 300 of the TLB 206, although the logic 600 receives the corresponding bit of the INV_GLOBAL bit vector 234 rather than the INV_LOCAL bit vector 232. Thus, advantageously, by setting a bit of the INV_GLOBAL bit vector 234, the mapping module 204 clears the corresponding bit of the GVAL bit vector 304 for every entry 300 of the TLB 206. Since each bit position of the GVAL 304 is the valid bit for all the global address translations for a respective address translation context, the invalidation logic 600 enables the mapping module 204 to simultaneously invalidate all the global address translations in the TLB 206 for the respective address translation context and to appreciate performance benefits similar to the local address translation invalidations discussed above.

Although not shown, the logic 600 includes other functions for each bit of the LVAL/GVAL bit vector 302/304 to set or clear the bit. For example, the memory subsystem 122 may write the bit to either binary state, such as required by the operation at blocks 408 and 412 of FIG. 4. Additionally, the memory subsystem 122 may clear a LVAL bit 302 of a particular set and way of the TLB 206, such as required by operation at blocks 2214 or 2308 of FIGS. 22 and 23, respectively, for example. Preferably, a multiplexing function is present just prior to the bit 302 that receives on one of multiple inputs the output of the Boolean AND function 606 and receives on its other inputs the outputs of the other logic described above but not shown.

It should be noted that, if necessary, bits of the LVAL 302 and GVAL 304 can be cleared simultaneously by setting bits in the INV_LOCAL bit vector 232 and INV_GLOBAL bit vector 234, respectively. For example, the memory subsystem 122 may do this at blocks 1828, 2318, 2326, 2408 and 2414. Finally, if necessary, all the bits of the LVAL 302 and/or GVAL 304 can be cleared simultaneously by setting all bits in the INV_LOCAL bit vector 232 and/or INV_GLOBAL bit vector 234, respectively. For example, the memory subsystem 122 may do this at blocks 1602, 1914 and 2004.

Figure 7:
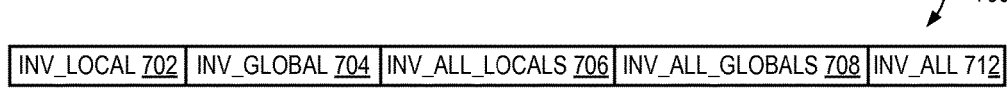
FIG. 7 is a block diagram illustrating a control register of the processor of FIG. 1.

Referring now to FIG. 7, a block diagram illustrating a control register 700 of the processor 100 of FIG. 1 is shown. In one embodiment, the control register 700 may be written by microcode 106 in order to invalidate TLB 206 address translations. The control register 700 includes a INV_LOCAL bit 702, INV_GLOBAL bit 704, INV_ALL_LOCALS bit 706, INV_ALL_GLOBALS bit 708, and INV_ALL bit 712. The operation of the mapping module 204 in response to the setting of these bits will now be described with respect to FIG. 8.

Figure 8:
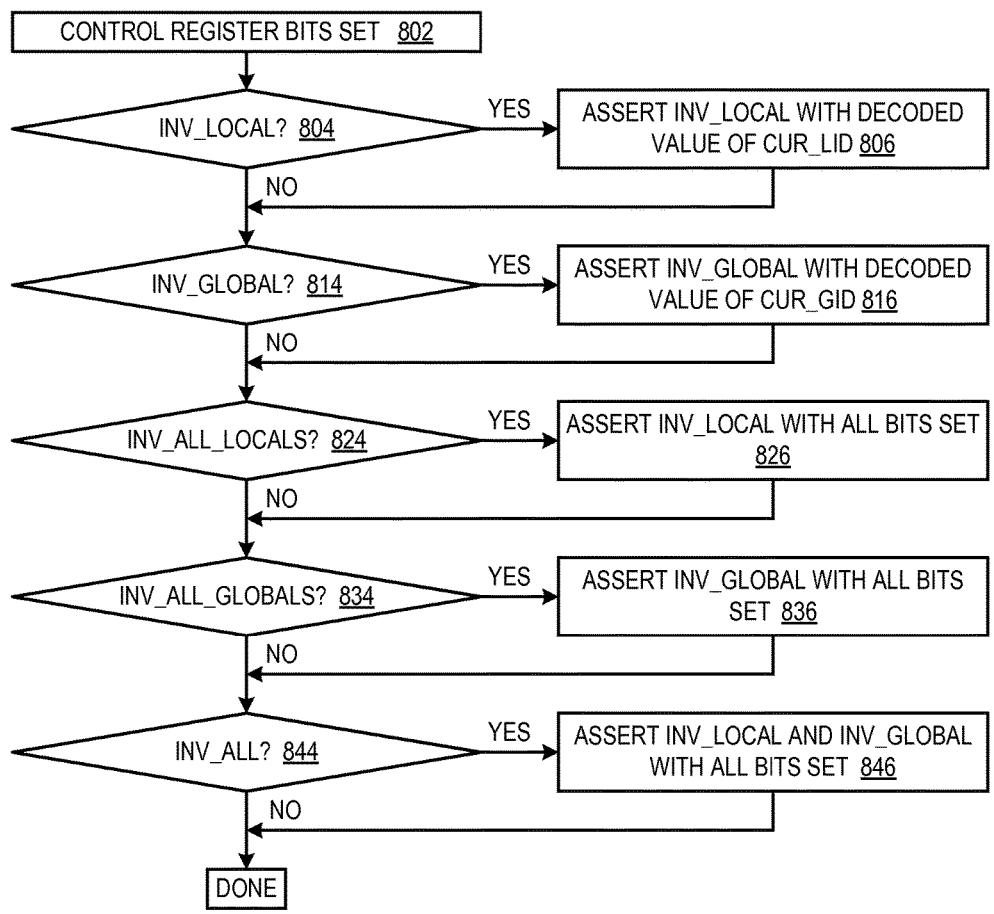
FIG. 8 is a flowchart illustrating operation of the mapping module in response to the setting of the various bits of the control register of FIG. 7.

Referring now to FIG. 8, a flowchart illustrating operation of the mapping module 204 in response to the setting of the various bits of the control register 700 of FIG. 7 is shown. Flow begins at block 802.

At block 802, one or more bits of the control register 700 are set, e.g., by microcode 106. Flow proceeds to decision block 804.

At decision block 804, if the INV_LOCAL bit 702 is set, flow proceeds to block 806; otherwise, flow proceeds to decision block 814.

At block 806, the mapping module 204 decodes the CUR_LID 242 to generate a one-hot bit vector value and asserts the value on the INV_LOCAL bit vector 232, which clears, for every entry 300 of the TLB 206, the bit of the LVAL 302 corresponding to the one set bit in the INV_LOCAL bit vector 232, which invalidates all local address translations in the TLB 206 translated using the current address translation context. Flow proceeds to decision block 814.

At decision block 814, if the INV_GLOBAL bit 704 is set, flow proceeds to block 816; otherwise, flow proceeds to decision block 824.

At block 816, the mapping module 204 decodes the CUR_GID 244 to generate a one-hot bit vector value and asserts the value on the INV_GLOBAL bit vector 234, which clears, for every entry 300 of the TLB 206, the bit of the GVAL 304 corresponding to the one set bit in the INV_GLOBAL bit vector 234, which invalidates all global address translations in the TLB 206 translated using the current address translation context. Flow proceeds to decision block 824.

At decision block 824, if the INV_ALL_LOCALS bit 706 is set, flow proceeds to block 826; otherwise, flow proceeds to decision block 834.

At block 826, the mapping module 204 asserts all bits of the INV_LOCAL bit vector 232, which clears, for every entry 300 of the TLB 206, all bits of the LVAL 302, which invalidates all local address translations in the TLB 206 translated using any address translation context. Flow proceeds to decision block 834.

At decision block 834, if the INV_ALL_GLOBALS bit 708 is set, flow proceeds to block 836; otherwise, flow proceeds to decision block 844.

At block 836, the mapping module 204 asserts all bits of the INV_GLOBAL bit vector 234, which clears, for every entry 300 of the TLB 206, all bits of the GVAL 304, which invalidates all global address translations in the TLB 206 translated using any address translation context. Flow proceeds to decision block 844.

At decision block 844, if the INV_ALL bit 712 is set, flow proceeds to block 846; otherwise, flow ends.

At block 846, the mapping module 204 asserts all bits of the INV_LOCAL bit vector 232 and all bits of the INV_GLOBAL bit vector 234, which clears, for every entry 300 of the TLB 206, all bits of the LVAL 302 and all bits of the GVAL 304, which invalidates all address translations in the TLB 206 translated using any address translation context. Flow ends at block 846.

Referring now to FIG. 9, a block diagram illustrating in more detail the local context table 212 of FIG. 2 is shown. Each entry includes a valid bit 906, a global context identifier (GID) 904, a local context identifier (LID) 902, a process context identifier (PCID) 908, and an address translation context base address (ATCB) 912. For each entry in the local context table 212, the GID 904 points to the associated entry in the global context table 214 of FIG. 10 having a matching GID 1004 value. The mapping module 204 guarantees that each valid entry in the local context table 212 has a unique LID 902 value and that each valid entry in the global context table 214 has a unique GID 1004 value. As an illustrative example, in an x86 ISA embodiment, the PCID 908 corresponds to an x86 process context identifier (PCID) and the ATCB 912 corresponds to bits [63:12] of the CR3 register, which specify a page directory base address. In one embodiment, bits [63:36] of the CR3 are unused. In the embodiment of FIG. 9, the local context table 212 includes four entries and each LID 902 is a two-bit encoded value, which implies a non-architectural local context identifier space of size four. In one embodiment, this also implies that address translations for at most four address translation contexts can be valid within the TLB 206 at any given time. However, other embodiments are contemplated with different numbers of entries and LID 902 bits. In one embodiment, the mapping module 204 initializes the local context table 212 by clearing the valid bits 906, assigning a unique value to the LID 902 of each of the local context table 212 entries and zeroing out the remaining fields. In one embodiment, the mapping module 204 maintains the local context table 212 entries as a stack in which the topmost entry is the most recently used and the bottom entry is the least recently used. Allocations are made of the least recently used (bottom) entry. The mapping module 204 makes an entry most recently used by making the entry the top entry and shifting other entries down as necessary. Operation of the local context table 212 and its fields will be described in more detail below with respect to the remaining Figures.

Referring now to FIG. 10, a block diagram illustrating in more detail the global context table 214 of FIG. 2 is shown. Each entry includes a valid bit 1006, a global context identifier (GID) 1004, a virtual processor identifier (VPID) 1008, and an extended page table pointer (EPTP) 1012. As an illustrative example, in an x86 ISA embodiment, the VPID 1008 corresponds to an x86 VMX virtual processor identifier (VPID) and the EPTP 1012 corresponds to the VMX EPTP specified in the virtual machine control structure (VMCS). In the embodiment of FIG. 10, the global context table 214 includes four entries and each GID 1004 is a two-bit encoded value, which implies a non-architectural global context identifier space of size four. However, other embodiments are contemplated with different numbers of entries and GID 904 bits. In one embodiment, the mapping module 204 initializes the global context table 214 by clearing the valid bits 1006 and assigning a unique value to the GID 1004 of each of the global context table 214 entries and zeroing out the remaining fields. In one embodiment, the mapping module 204 maintains the global context table 214 entries as a stack similar to the manner described above with respect to the local context table 212. Operation of the global context table 214 and its fields will be described in more detail below with respect to the remaining Figures. As may be observed from the description herein, the association of LIDs and GIDs may vary as operation of the processor 100 proceeds. For example, in the embodiment of FIGS. 9 and 10, a given GID may have between one and four associated LIDs. However, if more than one LID is associated with a GID, this reduces the number of possible currently valid GIDs. For example, only two GIDs can be valid if they each have two associated LIDs.

In an x86 ISA embodiment, in the case of non-VMX linear address spaces, the VPID and EPTP are set to zero; and, in the case of the VMX host, the VPID and EPTP are set to zero. Therefore, in one x86 ISA embodiment, the mapping module 204 treats one entry (the top entry, entry zero) of the global table 214 as special because it is always valid (i.e., V bit 1006 initialized to a set value and always remains set), is never replaced (e.g., is never the least-recently-used entry) and is always kept with the VPID 1008 and EPTP 1012 set to zero. Advantageously, this reduces the amount of TLB 206 address translation invalidation that must be performed as a consequence of the limited number of LIDs to which the large number of address translation contexts is mapped. In one embodiment, the local context table 212 and the global context table 214 are held in a private memory (PRAM) of the processor 100.

Referring now to FIG. 11, a flowchart illustrating operation of the processor 100 of FIG. 1 to perform an instruction that disables the architectural feature of the processor 100 that supports multiple process context identifiers is shown. Flow begins at block 1102.

At block 1102, the processor 100 encounters an instruction that disables the architectural feature of the processor 100 that supports multiple process context identifiers. As an illustrative example, in an x86 ISA embodiment, the instruction is a MOV CR4 instruction that clears the PCIDE bit, which disables the x86 PCID feature. Flow proceeds to block 1104.

At block 1104, in response to the instruction encountered at block 1102, the mapping module 204 searches the local context table 212 for all valid entries having a non-zero PCID value. Flow proceeds to block 1106.

At block 1106, for each local context table 212 entry found at block 1104, the mapping module 204 (1) invalidates local address translations in the TLB 206 associated with the LID 902 of the matching local context table 212 entry (e.g., by decoding the LID 902 value and asserting the decoded value on the INV_LOCAL bit vector 232), and (2) invalidates the matching local context table 212 entry. This embodiment assumes that PCID zero is always a valid value, i.e., the PCID is zero when the PCID feature is disabled. This leaves intact TLB 206 address translations associated with PCID zero. Flow ends at block 1106.

Referring now to FIG. 12, a flowchart illustrating operation of the processor 100 of FIG. 1 to perform an instruction that changes the current address translation context is shown. Flow begins at block 1202.

At block 1202, the processor 100 encounters an instruction that changes the current address translation context. As an illustrative example, in an x86 ISA embodiment, the instruction is a MOV_CR3 instruction. Flow proceeds to block 1204.

At block 1204, in response to the instruction encountered at block 1202, the processor 100 exits to a hypervisor if certain conditions are present. In one embodiment, the instruction is implemented in microcode 106. As an illustrative example, in an x86 ISA embodiment, the hypervisor is the VMX host and the conditions are that a VMX guest executed the MOV_CR3 instruction and there was an error or the VMX controls indicate a VM exit in response to a MOV_CR3 instruction. Flow proceeds to block 1206.

Figure 13:
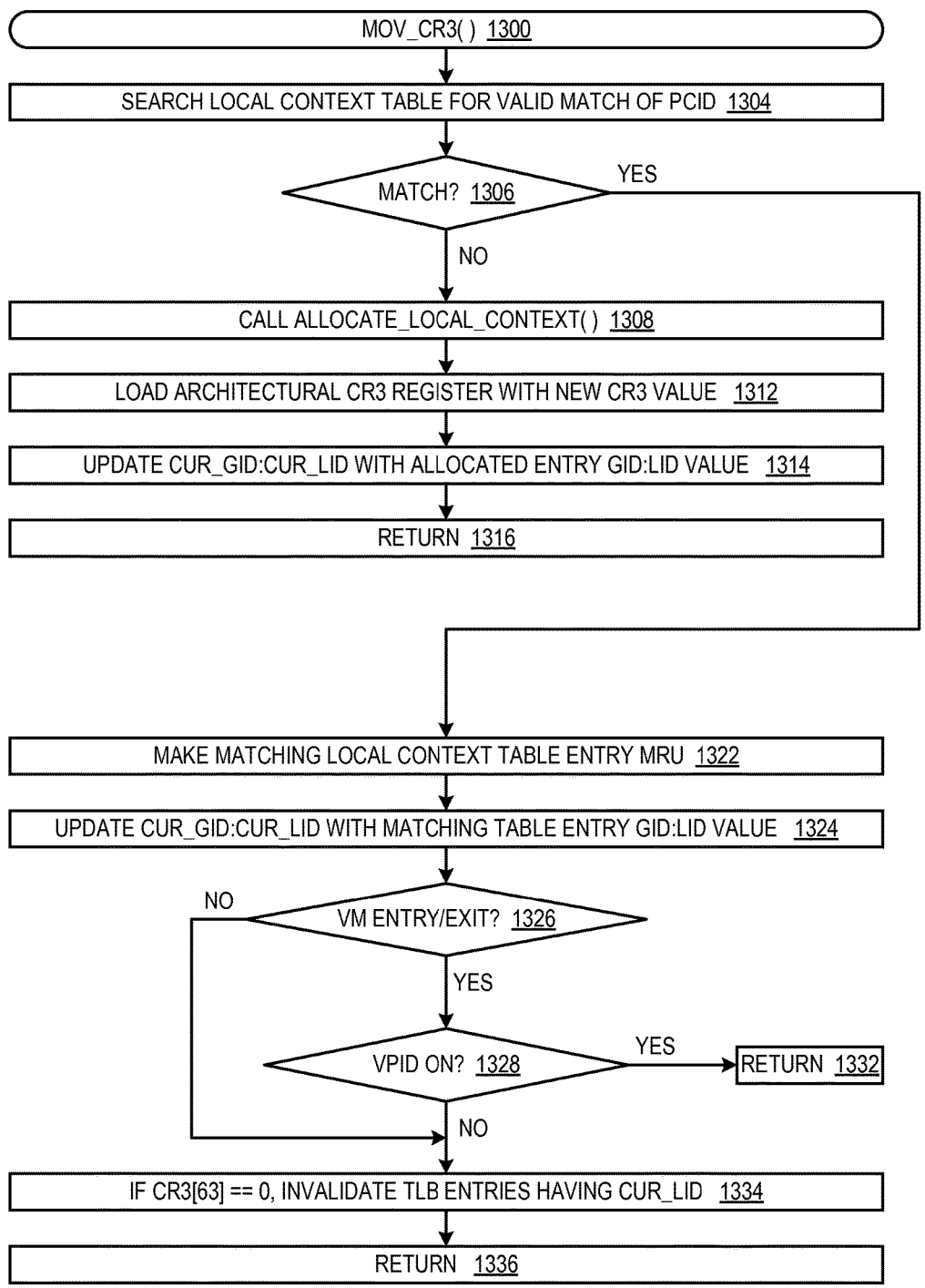
FIG. 13 is a flowchart illustrating operation of the processor of FIG. 1 to perform the MOV_CR3( ) routine called at blocks 1206, 1918 and 2106 of FIGS. 12, 19 and 21, respectively.

At block 1206, a call is made to a routine referred to herein as MOV_CR3( ), which is described with respect to FIG. 13. It should be understood that although the operation at block 1206 is referred to as a call of a routine (as are other operations described herein), the functions described in FIGS. 11 through 25 may be implemented in hardware, microcode, or a combination of hardware and microcode. Flow ends at block 1206.

Referring now to FIG. 13, a flowchart illustrating operation of the processor 100 of FIG. 1 to perform the MOV_CR3( ) routine 1300 called at block 1206 of FIG. 12 (and blocks 1918 and 2106 of FIGS. 19 and 21, respectively) is shown. Flow begins at block 1304.

At block 1304, the mapping module 204 searches the local context table 212 for a valid match of the PCID value provided as input to the MOV_CR3( ) routine 1300. When the routine is called from block 1206, the PCID input value is the value specified by the instruction of block 1202. When the routine is called from block 1918 or from block 2106, the PCID input value is the PCID value of the hypervisor, which is zero in the case of an x86 VMX embodiment. Flow proceeds to decision block 1306.

At block 1306, the mapping module 204 determines whether there was a match at block 1304. If so, flow proceeds to block 1322; otherwise, flow proceeds to block 1308.

Figure 14:
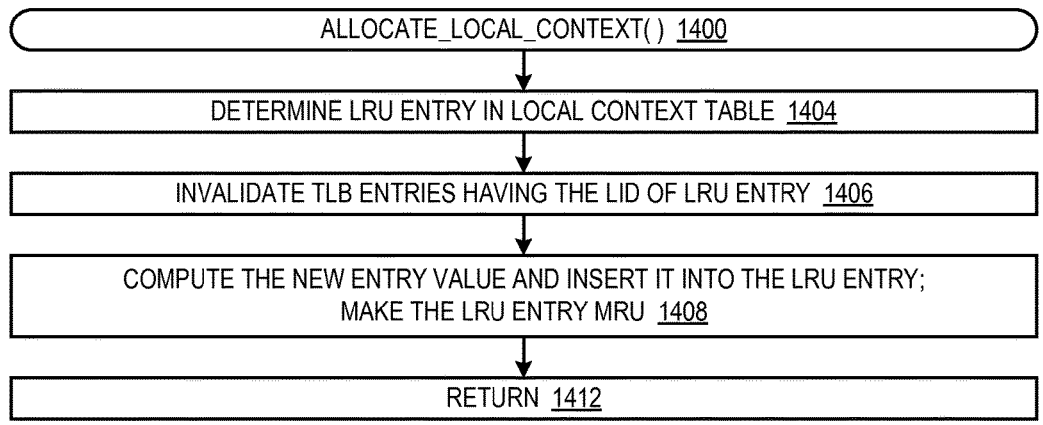
FIG. 14 is a flowchart illustrating operation of the processor of FIG. 1 to perform the ALLOCATE_LOCAL_CONTEXT( ) routine called at blocks 1308, 1606 and 1722 of FIGS. 13, 16 and 17, respectively.

At block 1308, the ALLOCATE_LOCAL_CONTEXT( ) routine is called, which is described with respect to FIG. 14. Flow proceeds to block 1312.

At block 1312, the architectural CR3 register is loaded with a CR3 register input value passed to the MOV_CR3( ) routine. When the routine is called from block 1206, the CR3 input value is the value specified by the instruction of block 1202. When the routine is called from block 1918 or from block 2106, the CR3 input value is the CR3 value of the hypervisor. In the case of non-x86 embodiments, the architectural register analogous to the CR3 register is loaded. Flow proceeds to block 1314.

At block 1314, the mapping module 204 updates the CUR_LID 242 and CUR_GID 244 with the LID 902 and GID 904, respectively, of the local context table 212 entry allocated at block 1308. Then flow returns at block 1316 to the place where the MOV_CR3( ) routine was called.

At block 1322, the mapping module 204 makes the matching local context table 212 entry (i.e., found in the search at block 1304) the most recently used entry. Flow proceeds to block 1324.

At block 1324, the mapping module 204 updates the CUR_LID 242 and CUR_GID 244 with the LID 902 and GID 904, respectively, of the matching local context table 212 entry. Flow proceeds to decision block 1326.

At decision block 1326, the mapping module 204 determines whether the MOV_CR3( ) routine was called in response to a VM entry or exit. If so, flow proceeds to decision block 1328; otherwise, flow proceeds to block 1334.

At decision block 1328, the mapping module 204 determines whether the VPID feature is on. If so, flow returns at block 1322 to the place where the MOV_CR3( ) routine was called; otherwise, flow proceeds to block 1334.

At block 1334, if the value of bit 63 of the CR3 register is zero, the mapping module 204 invalidates local address translations in the TLB 206 associated with the CUR_LID 242 value (e.g., by decoding the CUR_LID 242 value and asserting the decoded value on the INV_LOCAL bit vector 232). That is, the mapping module 204 invalidates the local address translations for the current address translation context. Then flow returns at block 1336 to the place where the MOV_CR3( ) routine was called.

Referring now to FIG. 14, a flowchart illustrating operation of the processor 100 of FIG. 1 to perform the ALLOCATE_LOCAL_CONTEXT( ) routine 1400 called at block 1308 of FIG. 13 (and blocks 1606 and 1722 of FIGS. 16 and 17, respectively) is shown. Flow begins at block 1404.

At block 1404, the mapping module 204 determines the least recently used entry in the local context table 212 to allocate. Other embodiments are contemplated that employ replacement algorithms other than least recently used. Flow proceeds to block 1406.

At block 1406, the mapping module 204 invalidates local address translations in the TLB 206 associated with the LID 902 of the local context table 212 entry allocated at block 1404. That is, the mapping module 204 invalidates the local address translations for the address translation context that is being evicted. Flow proceeds to block 1408.

At block 1408, the mapping module 204 computes the new value for the local context table 212 entry. In particular, the mapping module 204: retains the value in the LID 902 field, i.e., the new entry will inherit the LID 902 value of the entry being replaced; populates the GID 904 field with the CUR_GID 244 value, which will link the local context table 212 entry to the proper global context table 214 entry; and populates the PCID 908 and ATCB 912 fields with respective values passed to the ALLOCATE_LOCAL_CONTEXT( ) routine. If the routine is called from MOVTOCR3VPID, MOVTOCR3NOVPID or MOV_CR3( ) in response to a RSM (see FIG. 21), the PCID and ACTB values will be those of the process interrupted by the SMI. If the routine is called from MOVTOCR3VPID or MOVTOCR3NOVPID in response to a VM entry (see FIG. 15), the PCID and ACTB values will be those obtained from the VMCS of the virtual processor to which control is being transferred. If the routine is called from MOV_CR3( ) in response to a VM exit (see FIG. 19), the PCID and ACTB values will be those of the hypervisor. If the routine is called from MOV_CR3( ) in response to a MOV_CR3 instruction (see FIG. 12), the PCID and ACTB values will be those specified by the instruction. The mapping module 204 then loads the entry allocated at block 1404 with the computed new value and makes the allocated entry most recently used. Then flow returns at block 1412 to the place where the ALLOCATE_LOCAL_CONTEXT( ) routine was called.

Figure 15:
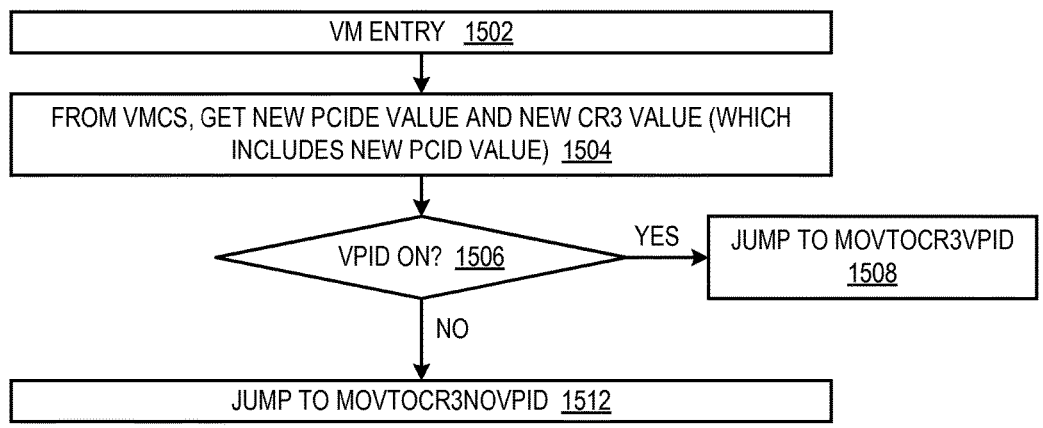
FIG. 15 is a flowchart illustrating operation of the processor of FIG. 1 when a transition from the hypervisor to a guest occurs.

Referring now to FIG. 15, a flowchart illustrating operation of the processor 100 of FIG. 1 when a transition from the hypervisor to a guest occurs is shown. Flow begins at block 1502.

At block 1502, a transition from the hypervisor to a guest occurs. As an illustrative example, in an x86 ISA embodiment, the transition is referred to as a VM entry, which occurs in response to the execution of a VMX VMLAUNCH or VMRESUME instruction. Flow proceeds to block 1504.

At block 1504, the mapping module 204 gets from the VMCS the new PCIDE value and the new value of the CR3 register, which includes a new PCID value. Flow proceeds to decision block 1506.

At decision block 1506, the mapping module 204 determines whether the VPID feature is on. If so, flow proceeds to block 1508; otherwise, flow proceeds to block 1512.

Figure 17:
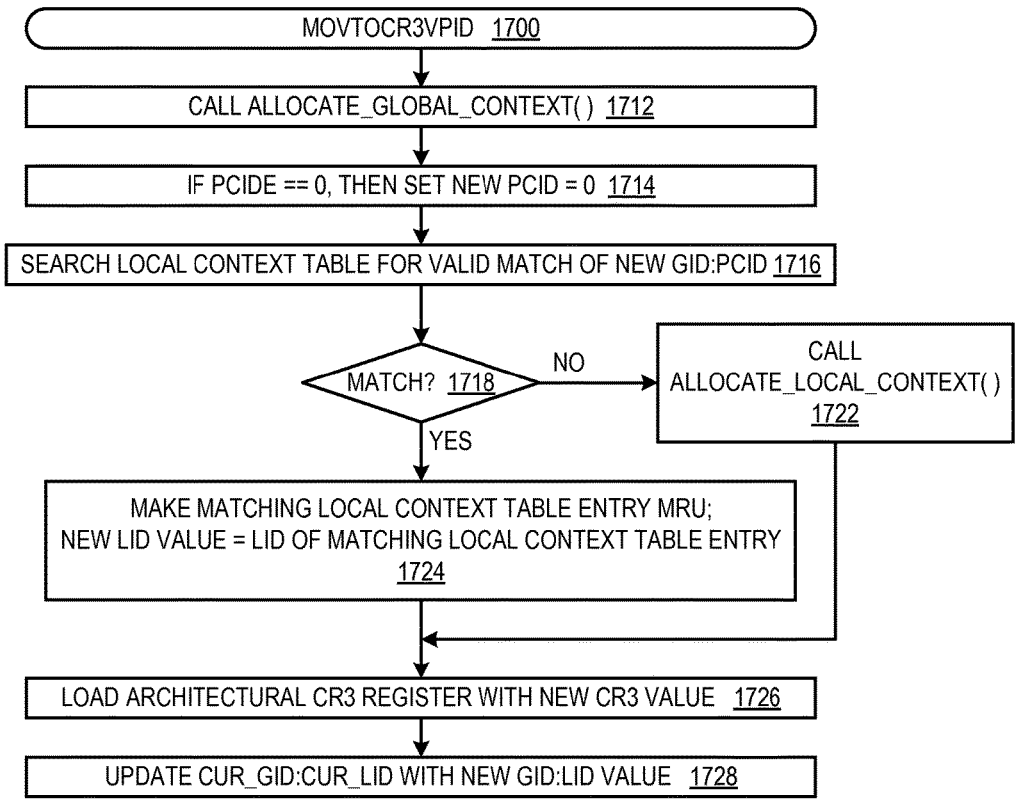
FIG. 17 is a flowchart illustrating operation of the processor of FIG. 1 to perform a MOVTOCR3VPID routine.

At block 1508, flow transfers to routine MOVTOCR3VPID, which is described with respect to FIG. 17.

Figure 16:
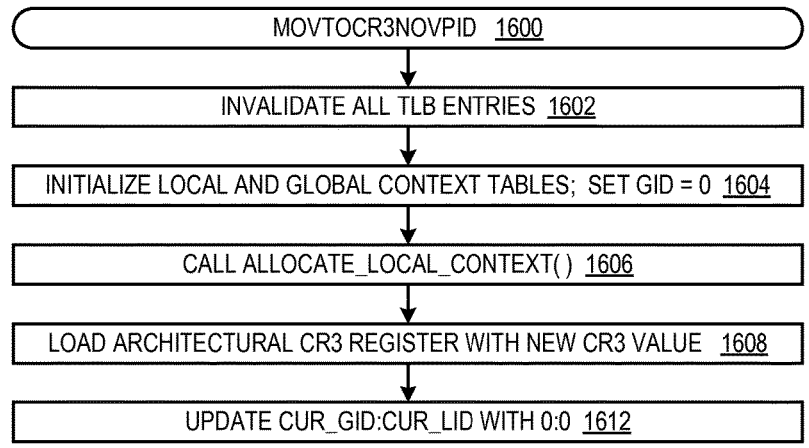
FIG. 16 is a flowchart illustrating operation of the processor of FIG. 1 to perform a MOVTOCR3NOVPID routine.

At block 1512, flow transfers to routine MOVTOCR3NOVPID, which is described with respect to FIG. 16.

Referring now to FIG. 16, a flowchart illustrating operation of the processor 100 of FIG. 1 to perform the MOVTOCR3NOVPID routine 1600 is shown. Flow begins at block 1602.

At block 1602, the mapping module 204 invalidates all address translations of the TLB 206. Flow proceeds to block 1604.

At block 1604, the mapping module 204 initializes the local context table 212 and the global context table 214. Additionally, the mapping module 204 sets a temporary value of the global context identifier to zero for passing to the ALLOCATE_LOCAL_CONTEXT( ) routine (see FIG. 14). Flow proceeds to block 1606.

At block 1606, the mapping module 204 calls the ALLOCATE_LOCAL_CONTEXT( ) routine. Flow proceeds to block 1608.

At block 1608, the architectural CR3 register is loaded with a CR3 register input value passed to the ALLOCATE_LOCAL_CONTEXT( ) routine, which will be values of the process interrupted by the SMI (RSM case) or values obtained from the VMCS of the virtual processor to which control is being transferred (VM entry case). Flow proceeds to block 1612.

At block 1612, the mapping module 204 updates the CUR_LID 242 and the CUR_GID 244 with zero values. Flow ends at block 1612.

Referring now to FIG. 17, a flowchart illustrating operation of the processor 100 of FIG. 1 to perform the MOVTOCR3VPID routine 1700 is shown. Flow begins at block 1712.

Figure 18:
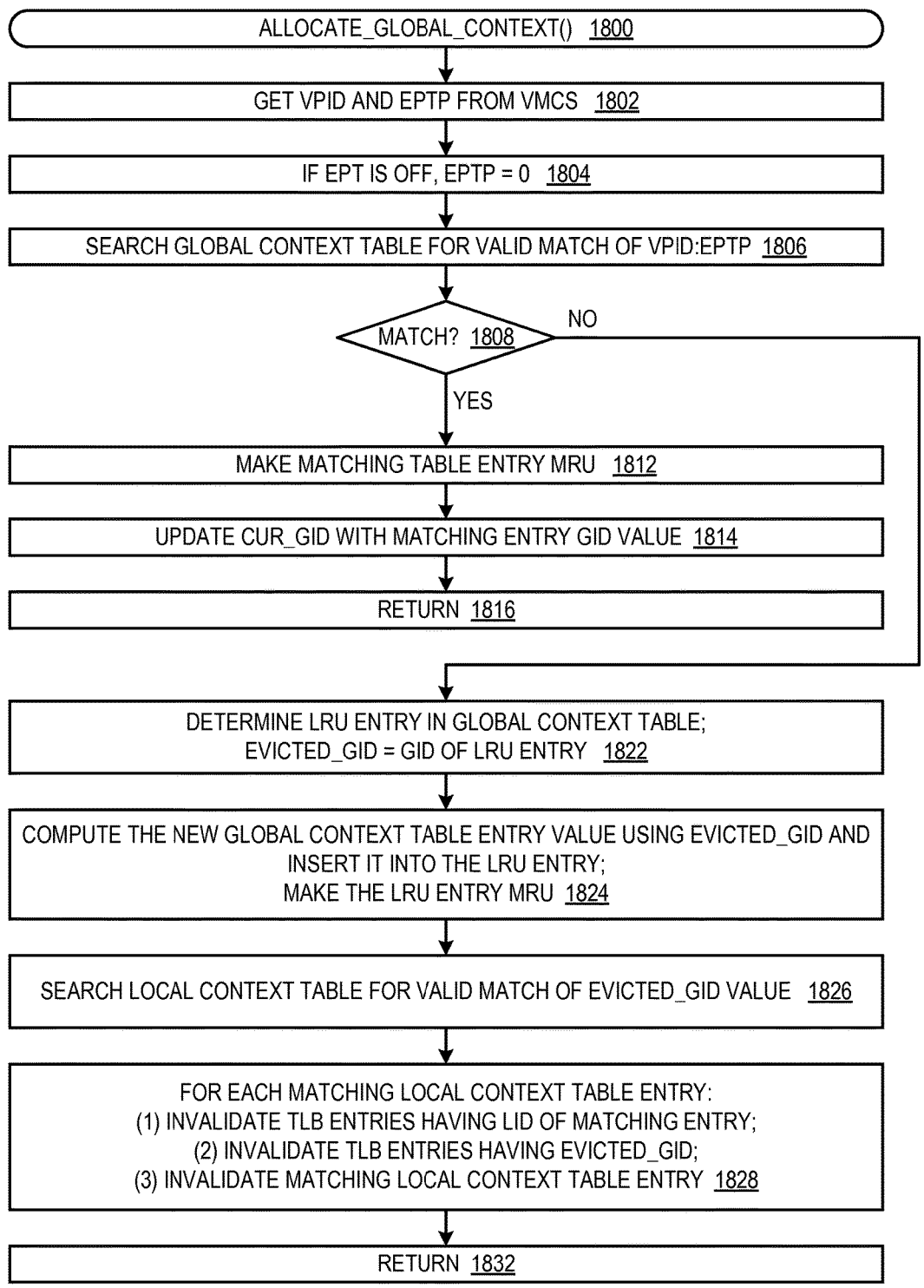
FIG. 18 is a flowchart illustrating operation of the processor of FIG. 1 to perform the ALLOCATE_GLOBAL_CONTEXT( ) routine called at block 1712 of FIG. 17.

At block 1712, the mapping module 204 calls the ALLOCATE_GLOBAL_CONTEXT( ) routine, which is described with respect to FIG. 18. Flow proceeds to block 1714.

At block 1714, if the PCIDE bit is zero, the mapping module 204 sets the new PCID value to zero. Flow proceeds to block 1716.

Figure 21:
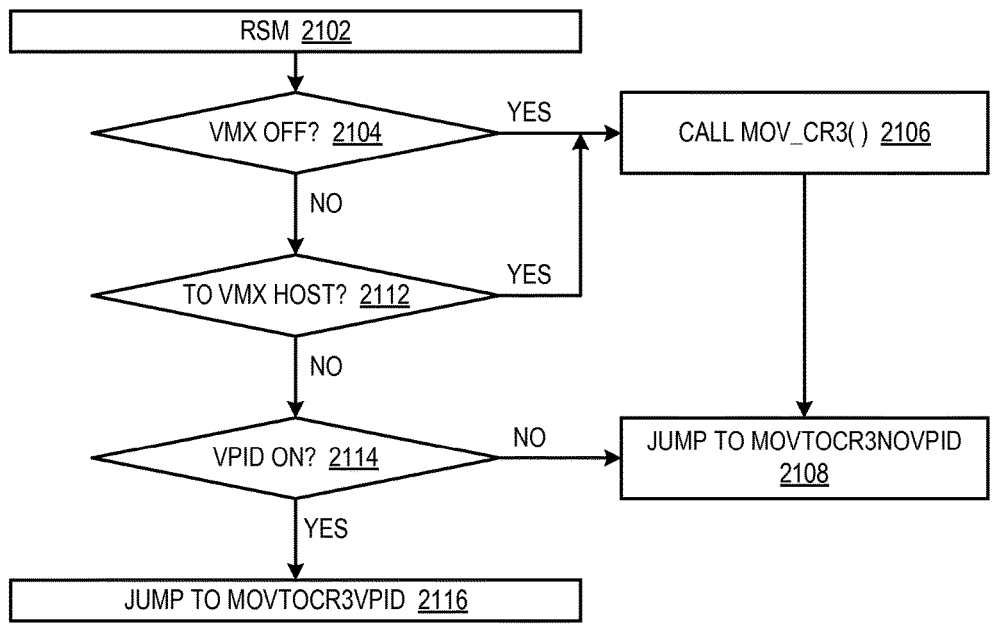
FIG. 21 is a flowchart illustrating operation of the processor of FIG. 1 when a transition out of SMM occurs.

At block 1716, the mapping module 204 searches the local context table 212 for a valid match of the global context identifier obtained via the call at block 1712 and the new PCID value, which is either the new PCID value obtained at block 1504 or the new PCID value obtained from the VMCS of the VMX guest to whom control is resumed from block 2116 of FIG. 21. Flow proceeds to decision block 1718.

At decision block 1718, if there is a matching entry found in the search at block 1716, flow proceeds to block 1724; otherwise, flow proceeds to block 1722.

At block 1722, the mapping module 204 calls the ALLOCATE_LOCAL_CONTEXT( ) routine (see FIG. 14). Flow proceeds to block 1726.

At block 1724, the mapping module 204 makes the matching local context table 212 entry the most recently used entry. The mapping module 204 also makes the new local context identifier equal to the LID 902 of the matching local context table 212 entry. Flow proceeds to block 1726.

At block 1726, the architectural CR3 register is loaded with a CR3 register value, which is either the new CR3 value obtained at block 1504 or the new CR3 value obtained from the VMCS of the VMX guest to whom control is resumed from block 2116 of FIG. 21. Flow proceeds to block 1728.

At block 1728, the mapping module 204 updates the CUR_GID 244 with the new global context identifier obtained at block 1712 and updates the CUR_LID 242 and with the new local context identifier obtained at either block 1722 or block 1724. Flow ends at block 1728.

Referring now to FIG. 18, a flowchart illustrating operation of the processor 100 of FIG. 1 to perform the ALLOCATE_GLOBAL_CONTEXT( ) routine 1800 called at block 1712 of FIG. 17 is shown. Flow begins at block 1802.

At block 1802, the mapping module 204 gets the VPID and EPTP from the VMCS of the VMX guest to which control is being given. Flow proceeds to block 1804.

At block 1804, if the EPT feature is off, the mapping module 204 sets the EPTP to zero. Flow proceeds to block 1806.

At block 1806, the mapping module 204 searches the global context table 214 for a valid match of the VPID and EPTP. In the embodiment described above with respect to FIG. 10 in which the top entry is special, only the non-special entries are searched here since the special entry cannot be reallocated and the special entry would not be associated with a VMX guest. Flow proceeds to decision block 1808.

At decision block 1808, the mapping module 204 determines whether a match was found in the search at block 1806. If so, flow proceeds to block 1812; otherwise, flow proceeds to block 1822.

At block 1812, the mapping module 204 makes the matching global context table 214 entry the most recently used entry. Flow proceeds to block 1814.

At block 1814, the mapping module 204 updates the CUR_GID 244 with the GID 1004 value of the matching global context table 214 entry. Flow returns at block 1816 to the routine that called the ALLOCATE_GLOBAL_CONTEXT( ) routine 1800.

At block 1822, the mapping module 204 determines the least recently used entry of the global context table 214, which will effectively be evicted. The mapping module 204 then assigns a variable EVICTED_GID to the value of the GID 1004 of the entry being evicted. Flow proceeds to block 1824.

At block 1824, the mapping module 204 computes the new value for the global context table 214 entry. In particular, the mapping module 204 populates the GID field 1004 with the EVICTED_GID and populates the VPID 1008 and EPTP 1012 fields with respective values passed to the ALLOCATE_GLOBAL_CONTEXT( ) routine, which will be values of the process interrupted by the SMI (RSM case) or values obtained from the VMCS of the virtual processor to which control is being transferred (VM entry case). The mapping module 204 then loads the entry allocated at block 1822 with the computed new value. The mapping module 204 then makes the allocated entry most recently used. Flow proceeds to block 1826.

At block 1826, the mapping module 204 searches the local context table 212 for a valid match of the EVICTED_GID. Flow proceeds to block 1828.

At block 1828, for each entry of the local context table 212 found at block 1826, the mapping module 204 (1) invalidates local address translations in the TLB 206 associated with the LID 902 of the matching entry; (2) invalidates global address translations in the TLB 206 associated with the EVICTED_GID (e.g., by decoding the EVICTED_GID value and asserting the decoded value on the INV_GLOBAL bit vector 234); and (3) invalidates the matching local context table 212 entry. Then flow returns at block 1832 to the place where the ALLOCATE_GLOBAL_CONTEXT( ) routine was called.

Figure 19:
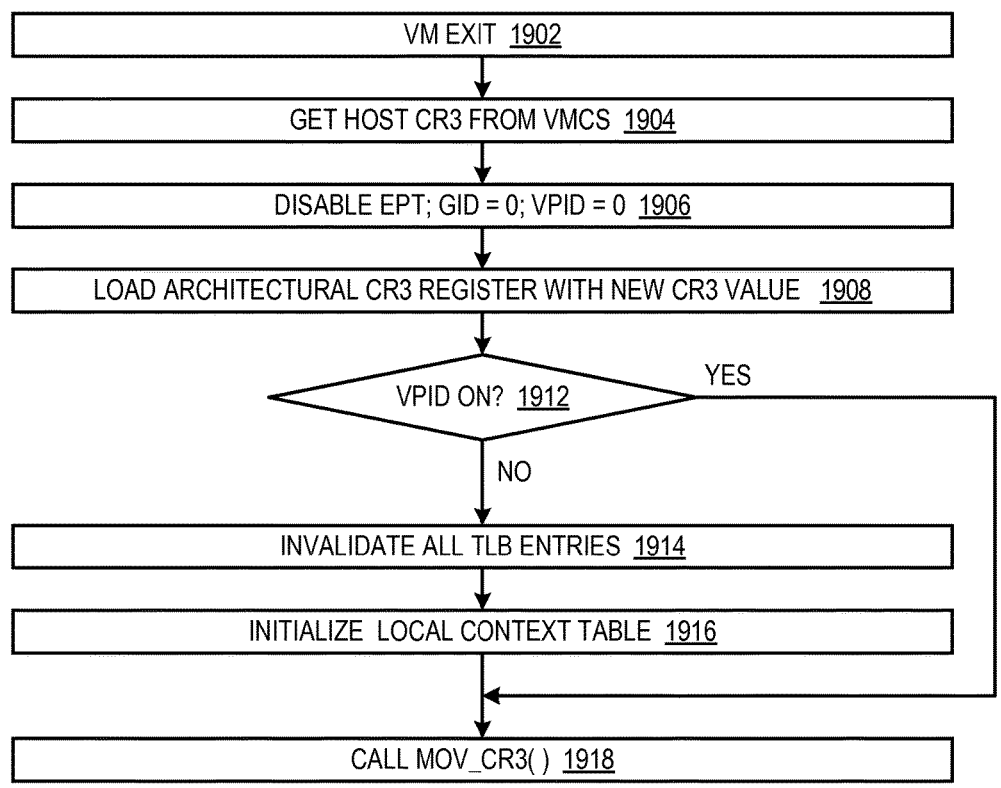
FIG. 19 is a flowchart illustrating operation of the processor of FIG. 1 when a transition to the hypervisor from a guest occurs.

Referring now to FIG. 19, a flowchart illustrating operation of the processor 100 of FIG. 1 when a transition to the hypervisor from a guest occurs is shown. Flow begins at block 1902.

At block 1902, a transition to the hypervisor from a guest occurs. As an illustrative example, in an x86 ISA embodiment, the transition is referred to as a VM exit, which occurs in response to the execution of certain instructions (for some of which a VM exit depends on settings in control fields) and certain events in VMX non-root operation, such as exceptions, interrupts, task switches and preemption timer ticks. Flow proceeds to block 1904.

At block 1904, the mapping module 204 gets from the VMCS the new value of the CR3 register, which includes a new PCID value, which is the PCID value of the hypervisor. Flow proceeds to decision block 1906.

At block 1906, the mapping module 204 disables the EPT feature (since it is not used by the hypervisor), sets a temporary global context identifier variable to zero and sets the VPID to zero, which are the values associated with the hypervisor. Flow proceeds to block 1908.

At block 1908, the architectural CR3 register is loaded with the CR3 register value obtained at block 1904. Flow proceeds to decision block 1912.

At decision block 1912, the mapping module 204 determines whether the VPID feature is on. If so, flow proceeds to block 1918; otherwise, flow proceeds to block 1914.

At block 1914, the mapping module 204 invalidates all address translations of the TLB 206. Flow proceeds to block 1916.

At block 1916, the mapping module 204 initializes the local context table 212. Flow proceeds to block 1918.

At block 1918, a call to the MOV_CR3( ) routine is made (see FIG. 13). Flow ends at block 1918.

Figure 20:
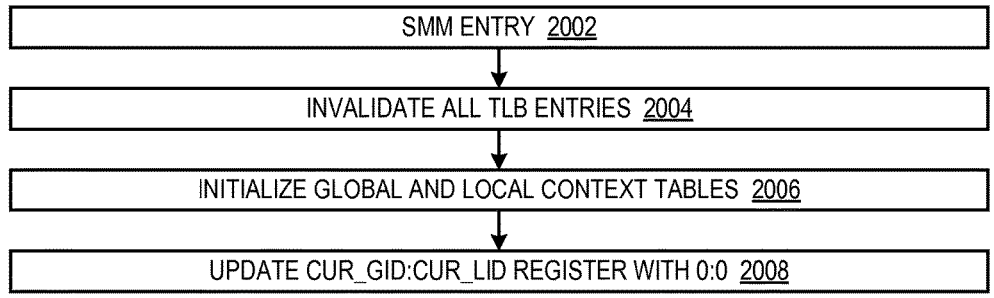
FIG. 20 is a flowchart illustrating operation of the processor of FIG. 1 when a transition to system management mode (SMM) occurs.

Referring now to FIG. 20, a flowchart illustrating operation of the processor 100 of FIG. 1 when a transition to system management mode (SMM) occurs is shown. Flow begins at block 2002.

At block 2002, a transition to SMM occurs, also referred to as SMM entry. In an x86 ISA embodiment, for example, the transition occurs through a system management interrupt (SMI). Flow proceeds to block 2004.

At block 2004, the mapping module 204 invalidates all address translations of the TLB 206. Flow proceeds to block 2006.

At block 2006, the mapping module 204 initializes the local context table 212 and the global context table 214. Flow proceeds to block 2008.

At block 2008, the mapping module 204 updates the CUR_LID 242 and the CUR_GID 244 with zero values. Flow ends at block 2008.

Referring now to FIG. 21, a flowchart illustrating operation of the processor 100 of FIG. 1 when a transition out of SMM occurs is shown. Flow begins at block 2102.

At block 2102, a transition out of SMM occurs. In an x86 ISA embodiment, for example, the transition occurs through execution of a return from SMM (RSM) instruction. Flow proceeds to decision block 2104.

At decision block 2104, the mapping module 204 determines whether the VMX feature is turned off. If so, flow proceeds to block 2106; otherwise, flow proceeds to decision block 2112.

At block 2106, a call to the MOV_CR3( ) routine is made (see FIG. 13). Flow proceeds to block 2108.

At block 2108, a jump to MOVTOCR3NOVPID is made (see FIG. 16). Flow ends at block 2108.

At decision block 2112, the mapping module 204 determines whether the return from SMM is to the hypervisor, which in the case of an x86 ISA embodiment is the VMX host. If so, flow proceeds to block 2106; otherwise, flow proceeds to decision block 2114.

At decision block 2114, the mapping module 204 determines whether the VPID feature is on. If so, flow proceeds to block 2116; otherwise, flow proceeds to block 2108.

At block 2116, a jump to MOVTOCR3VPID is made (see FIG. 17). Flow ends at block 2116.

Figure 22:
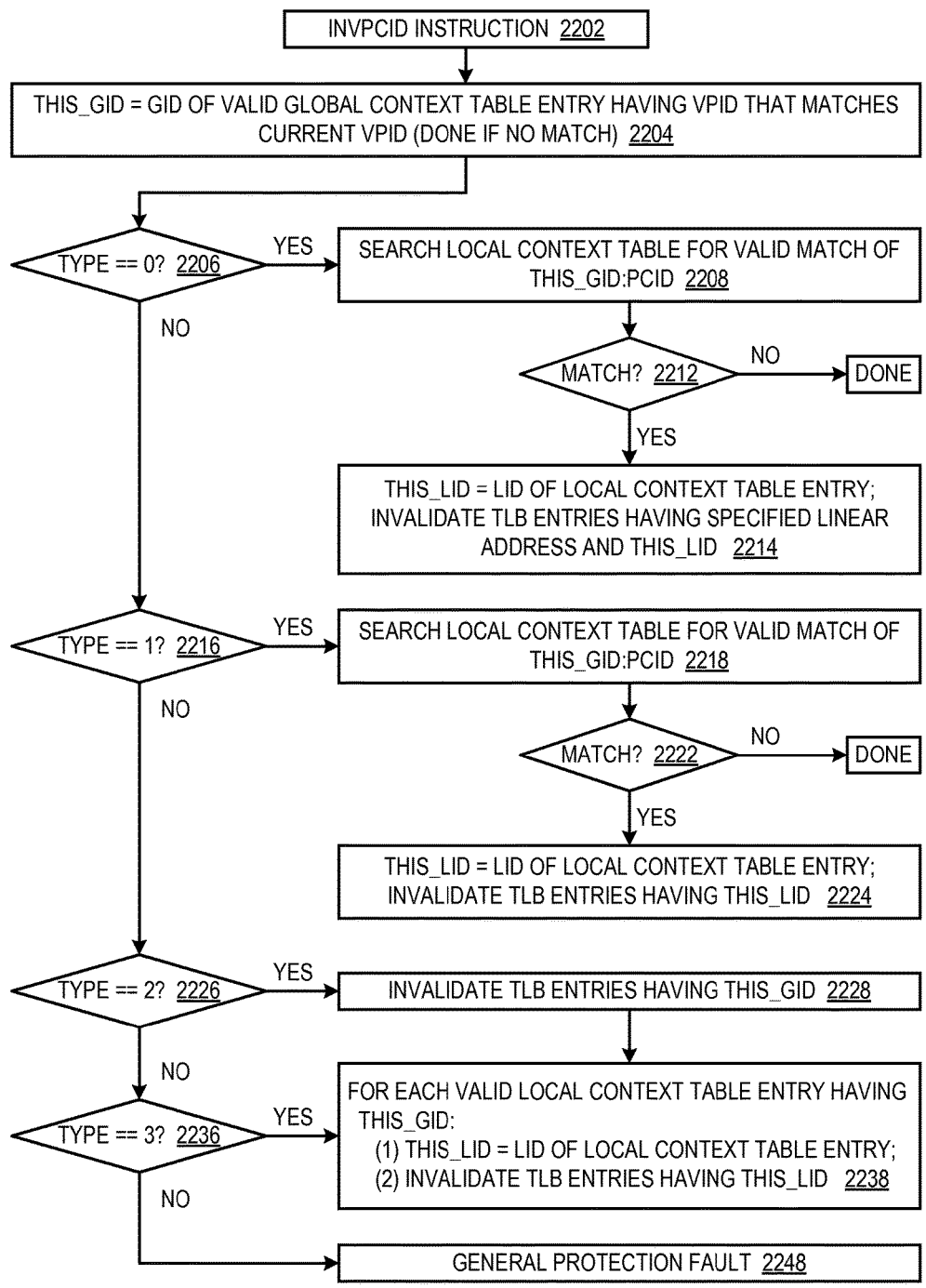
FIG. 22 is a flowchart illustrating operation of the processor to perform an instruction that invalidates TLB address translations associated with a process context identifier.

Referring now to FIG. 22, a flowchart illustrating operation of the processor 100 to perform an instruction that invalidates TLB 206 address translations associated with a process context identifier is shown. Flow begins at block 2202.

At block 2202, the processor 100 encounters the instruction that invalidates TLB 206 address translations associated with a process context identifier. In an x86 ISA embodiment, for example, the instruction is an INVPCID instruction. Flow proceeds to block 2204.

At block 2204, the mapping module 204 searches the global context table 214 for a valid match of the current VPID. If no match is found, flow ends. Otherwise, the mapping module 204 assigns a temporary variable THIS_GID with the GID 1004 of the matching global context table 214 entry. Flow proceeds to decision block 2206.

At decision block 2206, the mapping module 204 determines whether the instruction type (e.g., register operand of the x86 INVPCID instruction) is zero. If so, flow proceeds to block 2208; otherwise, flow proceeds to decision block 2216.

At block 2208, the mapping module 204 searches the local context table 212 for a valid match of THIS_GID and the PCID specified in the INVPCID instruction. Flow proceeds to decision block 2212.

At decision block 2212, the mapping module 204 determines whether a match was found at block 2208. If so, flow proceeds to block 2214; otherwise, flow ends.

At block 2214, the mapping module 204 assigns a temporary variable THIS_LID with the LID 902 of the matching local context table 212 entry found in the search at block 2208. The mapping module 204 then invalidates the local address translation in the TLB 206 associated with THIS_LID and having the virtual address (in an x86 ISA embodiment, the linear address) specified in the INVPCID instruction. The TLB 206 also includes an index input that selects a row of the TLB 206 for reading or writing. In one embodiment, the TLB 206 is a set-associative cache having multiple ways, and an additional input specifies the way to be read or written. In one embodiment, the index/way inputs can be used to specify a particular entry 300 to be invalidated. In one embodiment, when the memory subsystem 122 executes a microcode invalidate page microinstruction that specifies a virtual address, the memory subsystem 122 probes the TLB 206 for a match of the virtual address and receives the index/way that hits with the virtual address. The memory subsystem then invalidates the entry at the hitting index/way. Additionally, the memory subsystem 122 allocates an entry into the TLB 206 using the index/way of a least-recently-used entry, for example. Flow ends at block 2214.

At decision block 2216, the mapping module 204 determines whether the type is one. If so, flow proceeds to block 2218; otherwise, flow proceeds to decision block 2226.

At block 2218, the mapping module 204 searches the local context table 212 for a valid match of THIS_GID and the PCID specified in the INVPCID instruction. Flow proceeds to decision block 2222.

At decision block 2222, the mapping module 204 determines whether a match was found at block 2218. If so, flow proceeds to block 2224; otherwise, flow ends.

At block 2224, the mapping module 204 assigns a temporary variable THIS_LID with the LID 902 of the matching local context table 212 entry found in the search at block 2218. The mapping module 204 then invalidates local address translations in the TLB 206 associated with THIS_LID. Flow ends at block 2224.

At decision block 2226, the mapping module 204 determines whether the type is two. If so, flow proceeds to block 2228; otherwise, flow proceeds to decision block 2236.

At block 2228, the mapping module 204 invalidates global address translations in the TLB 206 associated with THIS_GID. Flow proceeds to block 2238.

At decision block 2236, the mapping module 204 determines whether the type is three. If so, flow proceeds to block 2238; otherwise, flow proceeds to block 2248.

At block 2238, the mapping module 204 searches the local context table 212 for a valid match of THIS_GID. For each matching local context table 212 entry found, the mapping module 204 (1) assigns a temporary variable THIS_LID with the LID 902 of the matching local context table 212 entry, and (2) invalidates local address translations in the TLB 206 associated with THIS_LID. Flow ends at block 2238.

At block 2248, the mapping module 204 causes a processor 100 fault to be generated, which in an x86 ISA embodiment, for example, is a general protection fault. Flow ends at block 2248.

Figure 23A:
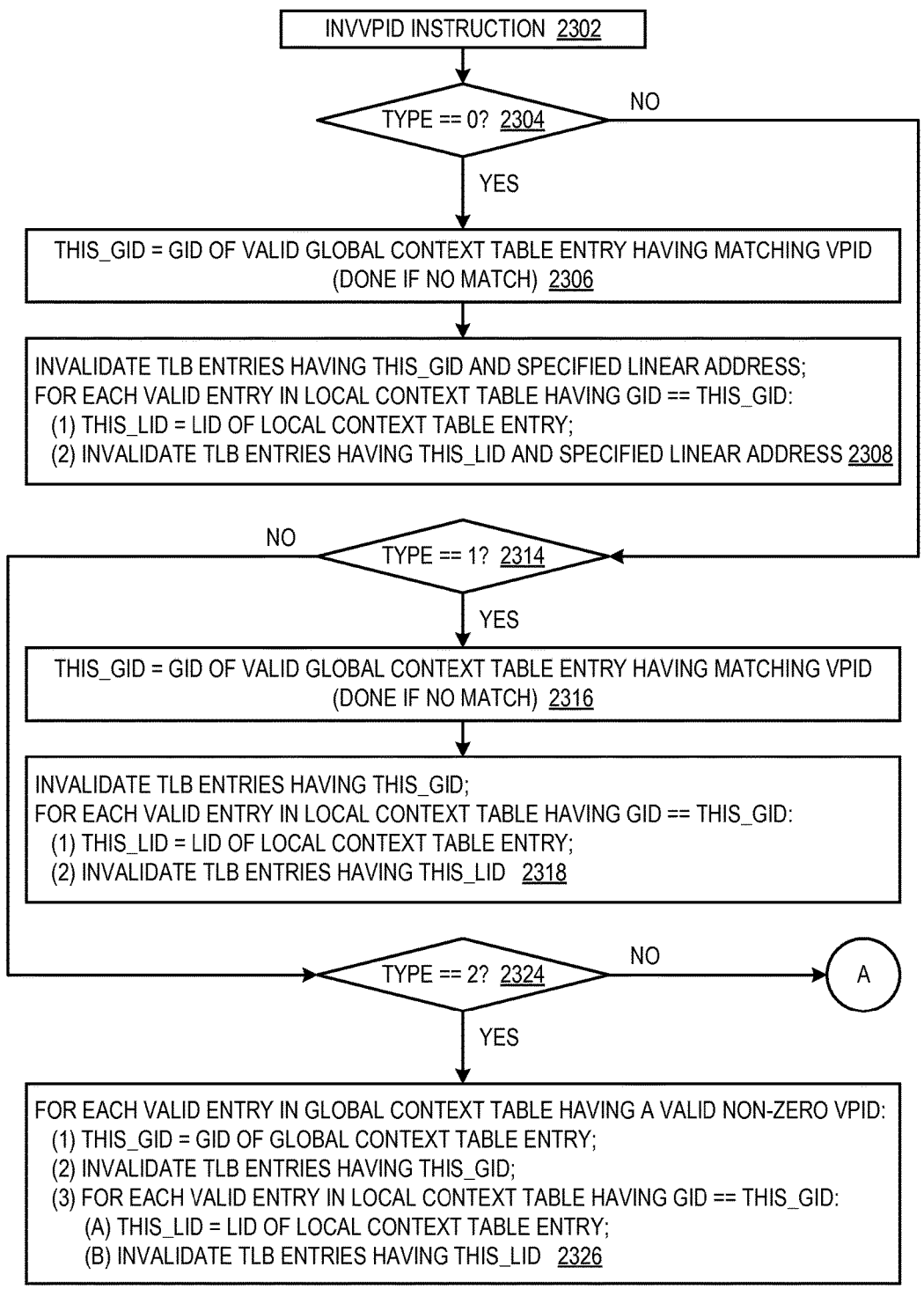
FIGS. 23A and 23B are a flowchart illustrating operation of the processor to perform an instruction that invalidates TLB address translations associated with a virtual processor identifier.
Figure 23B:
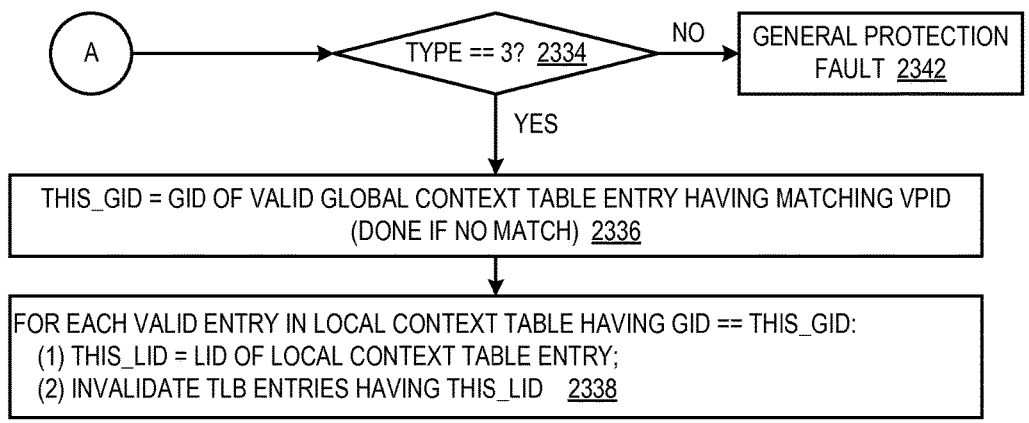

Referring now to FIGS. 23A and 23B (collectively FIG. 23), a flowchart illustrating operation of the processor 100 to perform an instruction that invalidates TLB 206 address translations associated with a virtual processor identifier is shown. Flow begins at block 2302.

At block 2302, the processor 100 encounters the instruction that invalidates TLB 206 address translations associated with a virtual processor identifier. In an x86 ISA embodiment, for example, the instruction is an INVVPID instruction. Flow proceeds to decision block 2304.

At decision block 2304, the mapping module 204 determines whether the instruction type (e.g., register operand of the x86 INVVPID instruction) is zero. If so, flow proceeds to block 2306; otherwise, flow proceeds to decision block 2314.

At block 2306, the mapping module 204 searches the global context table 214 for a valid match of the current VPID. If no match is found, flow ends. Otherwise, the mapping module 204 assigns a temporary variable THIS_GID with the GID 1004 of the matching global context table 214 entry. Flow proceeds to block 2308.

At block 2308, the mapping module 204 invalidates global address translations associated with THIS_GID. The mapping module 204 also searches the local context table 212 for a valid match of THIS_GID. For each matching local context table 212 entry found, the mapping module 204 (1) assigns a temporary variable THIS_LID with the LID 902 of the matching local context table 212 entry, and (2) invalidates the local address translation in the TLB 206 associated with THIS_LID and having the virtual address (in an x86 ISA embodiment, the linear address) specified in the INVPCID instruction. Flow ends at block 2308.

At decision block 2314, the mapping module 204 determines whether the instruction type is one. If so, flow proceeds to block 2316; otherwise, flow proceeds to decision block 2324.

At block 2316, the mapping module 204 searches the global context table 214 for a valid match of the current VPID. If no match is found, flow ends. Otherwise, the mapping module 204 assigns a temporary variable THIS_GID with the GID 1004 of the matching global context table 214 entry. Flow proceeds to block 2318.

At block 2318, the mapping module 204 invalidates global address translations associated with THIS_GID. The mapping module 204 also searches the local context table 212 for a valid match of THIS_GID. For each matching local context table 212 entry found, the mapping module 204 (1) assigns a temporary variable THIS_LID with the LID 902 of the matching local context table 212 entry, and (2) invalidates local address translations in the TLB 206 associated with THIS_LID. Flow ends at block 2318.

At decision block 2324, the mapping module 204 determines whether the instruction type is two. If so, flow proceeds to block 2326; otherwise, flow proceeds to decision block 2334.

At block 2326, the mapping module 204 searches the global context table 214 for a valid match of every non-zero VPID value. If no match is found, flow ends. Otherwise, for each matching global context table 214 entry, the mapping module 204: (1) assigns a temporary variable THIS_GID with the GID 1004 of the matching global context table 214 entry; (2) invalidates global address translations associated with THIS_GID; and (3) searches the local context table 212 for a valid match of THIS_GID, and for each matching local context table 212 entry found: (A) assigns a temporary variable THIS_LID with the LID 902 of the matching local context table 212 entry, and (B) invalidates local address translations in the TLB 206 associated with THIS_LID. Flow ends at block 2326.

At decision block 2334, the mapping module 204 determines whether the instruction type is three. If so, flow proceeds to block 2336; otherwise, flow proceeds to block 2342.

At block 2336, the mapping module 204 searches the global context table 214 for a valid match of the current VPID. If no match is found, flow ends. Otherwise, the mapping module 204 assigns a temporary variable THIS_GID with the GID 1004 of the matching global context table 214 entry. Flow proceeds to block 2338.

At block 2338, the mapping module 204 searches the local context table 212 for a valid match of THIS_GID. For each matching local context table 212 entry found, the mapping module 204 (1) assigns a temporary variable THIS_LID with the LID 902 of the matching local context table 212 entry, and (2) invalidates local address translations in the TLB 206 associated with THIS_LID. Flow ends at block 2338.

At block 2342, the mapping module 204 causes a processor 100 fault to be generated, which in an x86 ISA embodiment, for example, is a general protection fault. Flow ends at block 2342.

Figure 24:
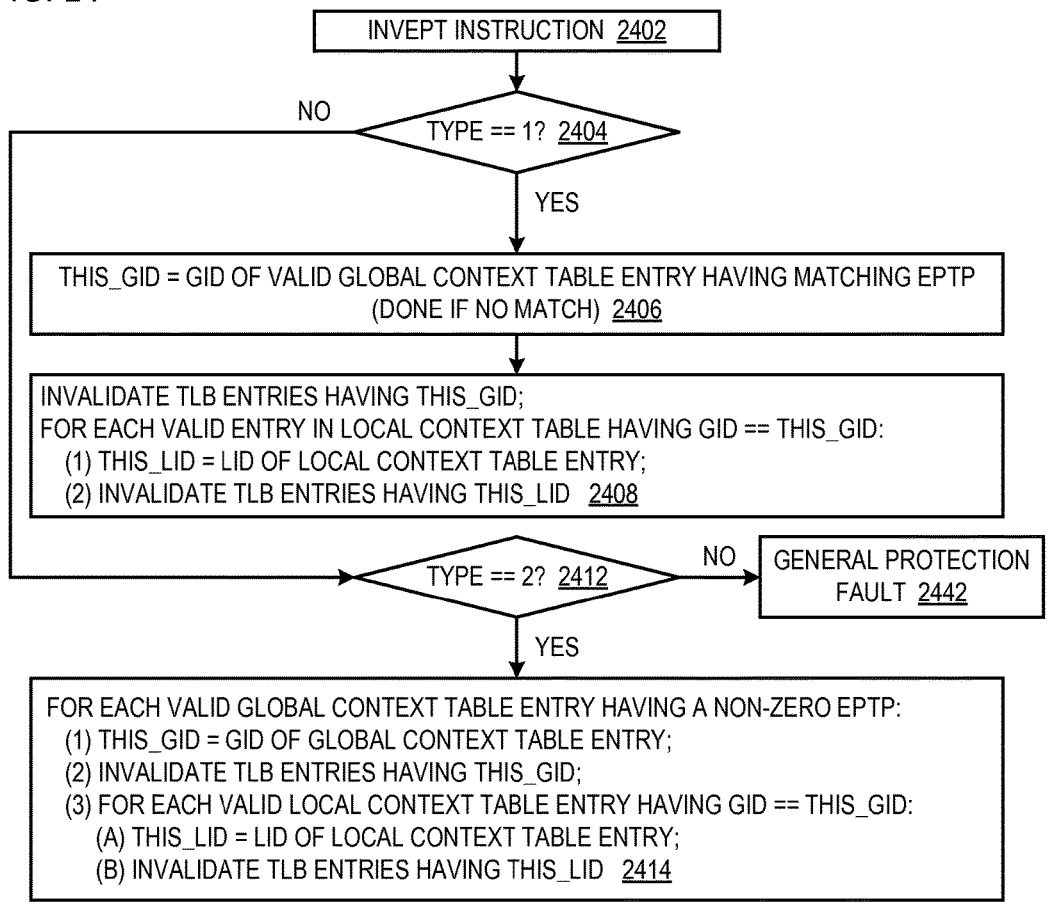
FIG. 24 is a flowchart illustrating operation of the processor to perform an instruction that invalidates TLB address translations associated with an extended page table pointer.

Referring now to FIG. 24, a flowchart illustrating operation of the processor 100 to perform an instruction that invalidates TLB 206 address translations associated with an extended page table pointer is shown. Flow begins at block 2402.

At block 2402, the processor 100 encounters the instruction that invalidates TLB 206 address translations associated with an extended page table pointer. In an x86 ISA embodiment, for example, the instruction is an INVEPT instruction. Flow proceeds to decision block 2404.

At decision block 2404, the mapping module 204 determines whether the instruction type (e.g., register operand of the x86 INVEPT instruction) is one. If so, flow proceeds to block 2406; otherwise, flow proceeds to decision block 2412.

At block 2406, the mapping module 204 searches the global context table 214 for a valid match of the EPTP specified in the INVEPT instruction. If no match is found, flow ends. Otherwise, the mapping module 204 assigns a temporary variable THIS_GID with the GID 1004 of the matching global context table 214 entry. Flow proceeds to block 2408.

At block 2408, the mapping module 204 invalidates global address translations associated with THIS_GID. The mapping module 204 also searches the local context table 212 for a valid match of THIS_GID. For each matching local context table 212 entry found, the mapping module 204 (1) assigns a temporary variable THIS_LID with the LID 902 of the matching local context table 212 entry, and (2) invalidates the local address translation in the TLB 206 associated with THIS_LID. Flow ends at block 2408.

At decision block 2412, the mapping module 204 determines whether the instruction type is two. If so, flow proceeds to block 2414; otherwise, flow proceeds to block 2442.

At block 2414, the mapping module 204 searches the global context table 214 for a valid match of every non-zero EPTP value. If no match is found, flow ends. Otherwise, for each matching global context table 214 entry, the mapping module 204: (1) assigns a temporary variable THIS_GID with the GID 1004 of the matching global context table 214 entry; (2) invalidates global address translations associated with THIS_GID; and (3) searches the local context table 212 for a valid match of THIS_GID, and for each matching local context table 212 entry found: (A) assigns a temporary variable THIS_LID with the LID 902 of the matching local context table 212 entry, and (B) invalidates local address translations in the TLB 206 associated with THIS_LID. Flow ends at block 2414.

At block 2442, the mapping module 204 causes a processor 100 fault to be generated, which in an x86 ISA embodiment, for example, is a general protection fault. Flow ends at block 2442.

Although embodiments have been described in which the size of the local (and global) context identifier space is a predetermined size (e.g., four), other embodiments are contemplated in which the size of the local (and global) context identifier space is different according to the desired design goals such as performance, size and power consumption. Additionally, although embodiments have been described with respect to a single TLB, it should be understand that the mechanisms described can be employed for each TLB in a processor having multiple TLBs. Furthermore, although embodiments are described with respect to TLBs, the mechanisms described herein may be employed in other translation cache structures, such as paging structure caches, for example, PML4 caches, PDPTE caches, and PDE caches of the x86 ISA. Still further, although embodiments are described in which bits appear to have a particular meaning of set or clear or zero or one, it should be understood that positive-logic and negative-logic implementations may be employed. Finally, although various embodiments are described with respect to the x86 ISA, the mechanisms for mapping a large architectural address translation context space to a smaller non-architectural address translation context space and for simultaneously invaliding address translations described herein may be employed in other ISAs, such as the ARM, MIPS or Sun ISAs.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A translation-lookaside buffer (TLB), comprising:
a plurality of entries, wherein each entry of the plurality of entries is configured to hold an address translation and a valid bit vector, wherein each bit of the valid bit vector indicates, for a respective address translation context, the address translation is valid if set and invalid if clear; and
an invalidation bit vector having bits corresponding to the bits of the valid bit vector of the plurality of entries, wherein a set bit of the invalidation bit vector indicates to simultaneously clear the corresponding bit of the valid bit vector of each entry of the plurality of entries.

2. The TLB of claim 1, wherein the valid bit vector comprises global and local portions and the invalidation bit vector comprises global and local portions corresponding to the global and local portions of the valid bit vector, respectively, wherein the global and local portions are mutually exclusive, wherein the address translation is a valid local address translation when one or more bits of the local portion of the valid bit vector is set, wherein the address translation is a valid global address translation when one or more bits of the global portion of the valid bit vector is set.

3. The TLB of claim 2, wherein a set bit of the local portion of the invalidation bit vector indicates to simultaneously clear the corresponding bit of the local portion of the valid bit vector of each entry of the plurality of entries and a set bit of the global portion of the invalidation bit vector indicates to simultaneously clear the corresponding bit of the global portion of the valid bit vector of each entry of the plurality of entries.

4. The TLB of claim 3, wherein the TLB is configured to simultaneously clear the corresponding bit of the local portion of the valid bit vector of each entry of the plurality of entries and the corresponding bit of the global portion of the valid bit vector of each entry of the plurality of entries.

5. The TLB of claim 2,
wherein the address translation comprises a pair of memory addresses in which a first of the pair is an address to be translated and the second of the pair is a translated address;
wherein the TLB indicates a hit and provides the translated address of an entry of the plurality of entries whose address to be translated matches a lookup address provided to the TLB and whose local portion of the valid bit vector includes a set bit that matches a corresponding set bit of a lookup local bit vector provided to the TLB or whose global portion of the valid bit vector includes a set bit that matches a corresponding set bit of a lookup global bit vector provided to the TLB, and otherwise indicates a miss; and
wherein the lookup local bit vector and the lookup global bit vector collectively indicate a current address translation context associated with a process that generates the lookup address.

6. The TLB of claim 1,
wherein the address translation comprises a pair of memory addresses in which a first of the pair is an address to be translated and the second of the pair is a translated address;
wherein the TLB indicates a hit and provides the translated address of an entry of the plurality of entries whose address to be translated matches a lookup address provided to the TLB and whose valid bit vector includes a set bit that matches a corresponding set bit of a lookup bit vector provided to the TLB, and otherwise indicates a miss; and
wherein the lookup bit vector indicates a current address translation context associated with a process that generates the lookup address.

7. A method for operating a translation-lookaside buffer (TLB) comprising a plurality of entries, wherein each entry of the plurality of entries is configured to hold an address translation and a valid bit vector, wherein each bit of the valid bit vector indicates, for a respective address translation context, the address translation is valid if set and invalid if clear, the method comprising:
receiving an invalidation bit vector having bits corresponding to the bits of the valid bit vector of the plurality of entries; and
simultaneously clearing the bit of the valid bit vector of each entry of the plurality of entries corresponding to a set bit of the invalidation bit vector.

8. The method of claim 7, wherein the valid bit vector comprises global and local portions and the invalidation bit vector comprises global and local portions corresponding to the global and local portions of the valid bit vector, respectively, wherein the global and local portions are mutually exclusive, wherein the address translation is a valid local address translation when one or more bits of the local portion of the valid bit vector is set, wherein the address translation is a valid global address translation when one or more bits of the global portion of the valid bit vector is set.

9. The method of claim 8, wherein said simultaneously clearing the bit of the valid bit vector of each entry of the plurality of entries corresponding to a set bit of the invalidation bit vector comprises:
simultaneously clearing the bit of the local portion of the valid bit vector of each entry of the plurality of entries corresponding to a set bit of the local portion of the invalidation bit vector; and
simultaneously clearing the bit of the global portion of the valid bit vector of each entry of the plurality of entries corresponding to a set bit of the global portion of the invalidation bit vector.

10. The method of claim 9, wherein said simultaneously clearing the bit of the local portion and said simultaneously clearing the bit of the global portion are performed simultaneously.

11. The method of claim 8, wherein the address translation comprises a pair of memory addresses in which a first of the pair is an address to be translated and the second of the pair is a translated address, wherein the method further comprises:
indicating a hit and providing the translated address of an entry of the plurality of entries whose address to be translated matches a lookup address provided to the TLB and whose local portion of the valid bit vector includes a set bit that matches a corresponding set bit of a lookup local bit vector provided to the TLB or whose global portion of the valid bit vector includes a set bit that matches a corresponding set bit of a lookup global bit vector provided to the TLB; and
otherwise indicating a miss; and
wherein the lookup local bit vector and the lookup global bit vector collectively indicate a current address translation context associated with a process that generates the lookup address.

12. The method of claim 7, wherein the address translation comprises a pair of memory addresses in which a first of the pair is an address to be translated and the second of the pair is a translated address, the method further comprising:
indicating a hit and providing the translated address of an entry of the plurality of entries whose address to be translated matches a lookup address provided to the TLB and whose valid bit vector includes a set bit that matches a corresponding set bit of a lookup bit vector provided to the TLB; and
otherwise indicating a miss; and
wherein the lookup bit vector indicates a current address translation context associated with a process that generates the lookup address.

13. The method of claim 7, further comprising:
generating a new address translation using a current address translation context in response to a miss in the TLB of a lookup address;
populating the address translation of one of the entries of the plurality of entries with the new address translation; and
populating the valid bit vector of the one of the entries of the plurality of entries with a bit-vectorized representation of a current context identifier that identifies a current address translation context associated with a process that generates the lookup address.

14. A processor, comprising:
translation-lookaside buffer (TLB), comprising:
- a plurality of entries, wherein each entry of the plurality of entries is configured to hold an address translation and a valid bit vector, wherein each bit of the valid bit vector indicates, for a respective address translation context, the address translation is valid if set and invalid if clear; and
- an invalidation bit vector having bits corresponding to the bits of the valid bit vector of the plurality of entries, wherein a set bit of the invalidation bit vector indicates to simultaneously clear the corresponding bit of the valid bit vector of each entry of the plurality of entries; and
- a mapping module, configured to generate the invalidation bit vector.

15. The processor of claim 14, wherein the valid bit vector comprises global and local portions and the invalidation bit vector comprises global and local portions corresponding to the global and local portions of the valid bit vector, respectively, wherein the global and local portions are mutually exclusive, wherein the address translation is a valid local address translation when one or more bits of the local portion of the valid bit vector is set, wherein the address translation is a valid global address translation when one or more bits of the global portion of the valid bit vector is set.

16. The processor of claim 15, wherein a set bit of the local portion of the invalidation bit vector indicates to simultaneously clear the corresponding bit of the local portion of the valid bit vector of each entry of the plurality of entries and a set bit of the global portion of the invalidation bit vector indicates to simultaneously clear the corresponding bit of the global portion of the valid bit vector of each entry of the plurality of entries.

17. The processor of claim 16, wherein the TLB is configured to simultaneously clear the corresponding bit of the local portion of the valid bit vector of each entry of the plurality of entries and the corresponding bit of the global portion of the valid bit vector of each entry of the plurality of entries.

18. The processor of claim 15,
wherein the address translation comprises a pair of memory addresses in which a first of the pair is an address to be translated and the second of the pair is a translated address;

wherein the TLB indicates a hit and provides the translated address of an entry of the plurality of entries whose address to be translated matches a lookup address provided to the TLB and whose local portion of the valid bit vector includes a set bit that matches a corresponding set bit of a lookup local bit vector provided to the TLB or whose global portion of the valid bit vector includes a set bit that matches a corresponding set bit of a lookup global bit vector provided to the TLB, and otherwise indicates a miss; and wherein the lookup local bit vector and the lookup global bit vector collectively indicate a current address translation context associated with a process that generates the lookup address.

19. The processor of claim 14,
wherein the address translation comprises a pair of memory addresses in which a first of the pair is an address to be translated and the second of the pair is a translated address;

wherein the TLB indicates a hit and provides the translated address of an entry of the plurality of entries whose address to be translated matches a lookup address provided to the TLB and whose valid bit vector includes a set bit that matches a corresponding set bit of a lookup bit vector provided to the TLB, and otherwise indicates a miss; and wherein the lookup bit vector indicates a current address translation context associated with a process that generates the lookup address.

20. The processor of claim 14, further comprising:
a memory subsystem that generates a new address translation using a current address translation context in response to a miss in the TLB of a lookup address and populates the address translation of one of the entries of the plurality of entries with the new address translation and populates the valid bit vector of the one of the entries of the plurality of entries with a bit-vectorized representation of a current context identifier that identifies a current address translation context associated with a process that generates the lookup address.

* * * * *